United States Patent
Shimoda et al.

[11] Patent Number: 6,017,455
[45] Date of Patent: Jan. 25, 2000

[54] POROUS MEMBRANE

[75] Inventors: Teruyoshi Shimoda; Hiroshi Hachiya, both of Kurashiki, Japan

[73] Assignee: Asahi Kasei Kogyo Kabushiki Kaisha, Osaka, Japan

[21] Appl. No.: 08/945,862

[22] PCT Filed: Mar. 1, 1996

[86] PCT No.: PCT/JP96/00495

§ 371 Date: Nov. 7, 1997

§ 102(e) Date: Nov. 7, 1997

[87] PCT Pub. No.: WO96/35503

PCT Pub. Date: Nov. 14, 1996

[30] Foreign Application Priority Data

May 9, 1995 [JP] Japan ................................ 7-134718

[51] Int. Cl.$^7$ .................................................. B01D 39/00
[52] U.S. Cl. ............................... 210/500.23; 210/500.27; 210/500.28
[58] Field of Search .................. 210/500.23, 500.21, 210/500.27, 500.28; 264/41, 209.1; 521/180; 428/159

[56] References Cited

U.S. PATENT DOCUMENTS

| | | |
|---|---|---|
| 4,320,224 | 3/1982 | Rose et al. ............................... 528/125 |
| 4,755,540 | 7/1988 | Blakey . |
| 4,897,307 | 1/1990 | Beck et al. . |
| 4,957,817 | 9/1990 | Chav et al. ............................ 264/209.2 |
| 4,992,485 | 2/1991 | Koo et al. . |
| 5,004,836 | 4/1991 | Kricheldorf et al. .................... 568/333 |
| 5,082,565 | 1/1992 | Haubs et al. . |
| 5,200,078 | 4/1993 | Beck et al. .......................... 210/500.23 |
| 5,205,968 | 4/1993 | Damrow et al. .................... 210/500.27 |
| 5,227,101 | 7/1993 | Mahoney et al. . |
| 5,288,834 | 2/1994 | Roovers et al. ......................... 528/125 |

FOREIGN PATENT DOCUMENTS 3174231A 7/1991 Japan .

*Primary Examiner*—Ana Fortuna
*Attorney, Agent, or Firm*—Birch, Stewart, Kolasch & Birch, LLP

[57] ABSTRACT

The present invention provides an anisotropically porous membrane which is obtained according to a wet process, which comprises a substantially non-sulfonated aromatic polyether ketone having a crystallinity of 10 percent by weight or higher, and which has open pores having an average pore diameter of 0.02 to 30.00 μm on both surfaces of said membrane at an open pore ratio of 7 to 90 percent. In accordance with the present invention, a porous crystalline aromatic polyether ketone membrane is provided which is excellent in heat resistance, chemical resistance, water resistance, water permeability and a balance of water permeability and fractionating characteristics.

12 Claims, 10 Drawing Sheets

POROUS MEMBRANE

This application is the national phase under 35 U.S.C. §371 of prior PCT International Application No. PCT/JP 96/00495, which has an International filing date of Mar. 1, 1996, which designated the United States of America, the entire contents of which are hereby incorporated by reference.

TECHNICAL FIELD

The present invention relates to a porous aromatic polyether ketone membrane and a process for preparing the same. More particularly, the present invention relates to a porous aromatic polyether ketone membrane which has excellent heat and chemical resistance, low elution characteristics and an excellent balance of water permeability and fractionating characteristics and which is useful as a separation membrane, and a process for preparing the same.

BACKGROUND ART

Porous membranes are used as separation membranes in various industrial fields. For example, the membranes are widely used for the preparation of ultrapure water in the field of semiconductor production, the removal of a very small amount of iron contained in cooling water at power plants and filtration or the removal of microorganisms in medical appliances and in the pharmaceutical and food industries. The current trend is one of continuing expansion in the range and volume of the application and use of such membranes. Above all, the demand for porous membranes excellent in heat and chemical resistance is on the increase. For example, in the semiconductor production field, it is desirable to raise the temperature of ultrapure water in order to effectively wash the fine regions of semiconductors with the water. Therefore, porous membranes are in demand from which ion fractions, organic substances or the like are eluted in small quantities at high temperatures and which are excellent in heat and chemical resistance. At thermal or nuclear power plants, separation membranes are in demand which have particularly excellent heat resistance and which make it possible to stably remove cruds (particulate substances mostly comprising iron) from steam condensates having a temperature of 100 degrees C. or higher for a long period without cooling the steam condensates.

At present, materials used for porous membranes include cellulose derivatives such as cellulose acetate, etc. and polymers such as polyacrylonitrile resins, polyamide resins, polymethyl methacrylate resins, polysulfone resins, polyvinylidene floride resins, polyethylene resins, polycarbonate resins, etc., and membranes prepared from these materials are widely employed for ultrafiltration or microfiltration. However, the membranes of these materials are inferior in heat, chemical and boiling water resistance, so that the membranes are not suitable for the aforesaid uses. For the above-mentioned reasons, attention has been paid to aromatic polyether ketones as materials for filtration membranes because of their extreme excellence in heat and chemical resistance. Therefore, attempts have been made to develop porous membranes made from aromatic polyether ketones.

For example, JP-A-3-21333 (corresponding to EP-A-8894) and JP-B-6-34912 propose separation membranes comprising sulfones of polyether ether ketones which are aromatic polyether ketones and processes for preparing the membranes. Membranes of such sulfones, however, are known to swell in water (*Macromolecules*, 86, p.18, 1985).

Further, the membranes dissolve, intensely swell or deform in organic solvents such as acetone, alcohols, tetrahydrofuran, dimethyl formamide, so that their application range is limited. The proposed membranes, therefore, cannot be employed in fields that require the high performance of filtration membranes.

Furthermore, porous non-sulfonated aromatic polyether ketone membranes from melt or wet processes and the production processes thereof have been proposed.

Referring to the melt processes, for example, JP-B-5-33267 (corresponding to U.S. Pat. No. 4,755,540) and JP-A-3-106424 (corresponding to EP-A-417908) propose processes for preparing porous membranes useful as separation membranes wherein aromatic polyether ketones, thermoplastic polymers which are imcompatible with said aromatic polyether ketones, and plasticizers are melt compounded under heat at high temperatures to obtain mixtures, which are formed into desirable shapes, cooled and washed to remove said imcompatible thermoplastic polymers and plasticizers.

JP-A-3-237142 (corresponding to EP-A-409496) and JP-A-4-293533 (corresponding to U.S. Pat. No. 5,227,101) propose processes for preparing porous membranes in the same way as mentioned above except that compatible plasticizers and latent solvents are used as plasticizers. However, according to these processes it is difficult to prepare membranes which are anisotropic in cross section, although the membranes have open pores on the surfaces thereof. Even if some membranes mentioned above are anisotropic in structure, the membranes do not have an excellent balance of water permeability and fractionating characteristics since one of their surfaces has no open pores or has a tight skin layer with an open pore ratio of 7 percent or lower. Particularly, the membranes prepared according to the latter processes have a problem of extremely low water permeability. Further, there is another problem in that the imcompatible thermoplastic polymers and plasticizers used in the preparation of the membranes tend to remain therein and to be eluted therefrom when they are used as separation membranes.

JP-A-7-776 proposes a process for preparing a membrane comprising an aromatic polyether ketone and inorganic or organic particulates, wherein said membrane is prepared by melt compounding the aromatic polyether ketone and the particulates to obtain a molten mixture, which is formed into a desirable shape, cooled and stretched. However, in general the membrane that is obtained according to the above-mentioned process tends not to be uniform in pore size on the surfaces thereof. Further, when the membrane is used for filtration of water at high temperatures for purification purposes, the particulates and ion fractions which are contained in the membrane tend to be eluted therefrom into the hot water filtrate.

Referring to the wet processes on the other hand, JP-A-2-136229 (corresponding to U.S. Pat. No. 4,992,485), JP-A-3-56129 (corresponding to EP-A-382356) and JP-A-3-174231 (corresponding to U.S. Pat. No. 5,082,565) propose processes for preparing porous membranes, wherein aromatic polyether ketones are homogeneously dissolved in strong acids to prepare membrane forming stock solutions, which are formed into desirable shapes and immersed in poor solvents against the polyether ketones for the precipitation and coagulation thereof. JP-A-3-172349 (corresponding to U.S. Pat. No. 4,897,307) proposes a method of crystallizing the thus obtained membranes. These wet processes are effective for obtaining membranes which are asymmetric in cross section, but the surfaces of these membranes do not have open pores that can be observed with a scanning electron microscope or have tight skin layers which are very low in open pore ratio. For these reasons, the membranes are useful for ultrafiltration but are unusable, for example, for microfiltration because of low water permeability. Further, the membranes proposed in the former patent publications are low in heat resistance because the membranes are not heat stabilized.

DISCLOSURE OF THE INVENTION

The present invention provides a porous, crystalline and aromatic polyether ketone membrane which is excellent in heat, chemical and boiling water resistance as well as water permeability and a balance of water permeability and fractionating characteristics.

The present invention provides an anisotropically structured porous membrane which is prepared according to a wet process, which comprises a substantially non-sulfonated aromatic polyether ketone having a crystallinity of 10 percent by weight or higher and which has open pores having an average pore diameter of 0.02–30.00 µm on both surfaces thereof at an open pore ratio of 7–90 percent, and a process for preparing said membrane.

The aromatic polyether ketones of the porous membrane according to the present invention are polymers comprising repeating units represented by the following formula:

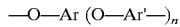

wherein Ar and Ar' are aromatic moieties, Ar has at least one diaryl ketone bond, both Ar and Ar' are covalently linked to ether groups through aromatic carbon atoms and n is 0, 1 or 2.

In accordance with the present invention, the aromatic polyether ketones comprising repeating units in which Ar and Ar' are respectively represented by the following formulae are preferably usable.

Ar:

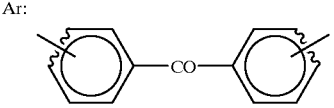

Ar':

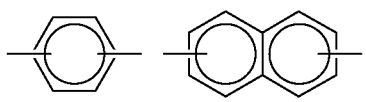

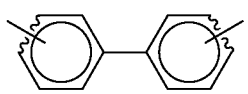

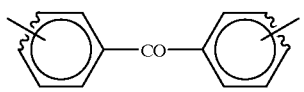

Furthermore, according to the present invention, the aromatic polyether ketones comprising repeating units represented by formulae (1) through (17) are preferable.

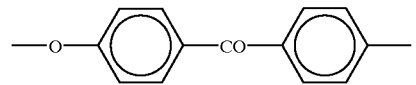
(1)

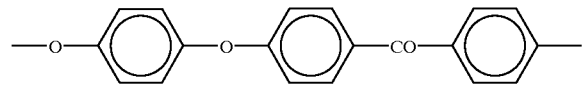
(2)

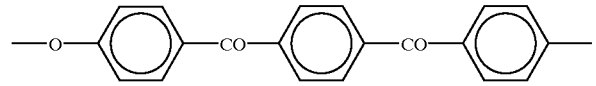
(3)

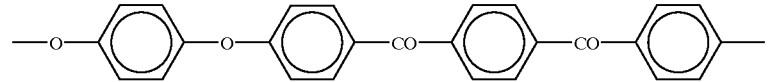
(4)

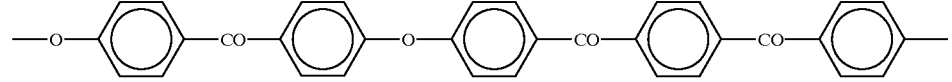
(5)

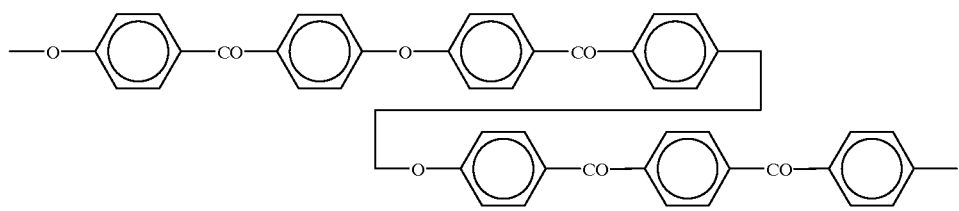
(6)
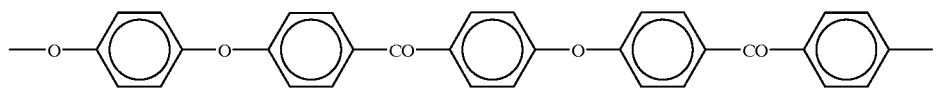
(7)
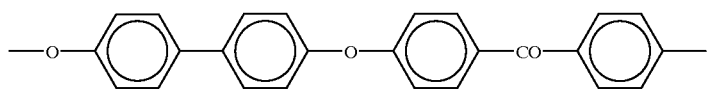
(8)
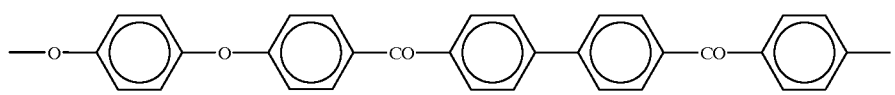
(9)
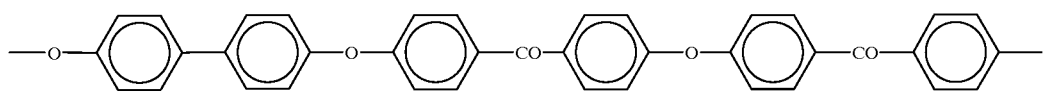
(10)
(11)
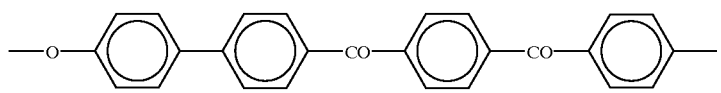
(12)
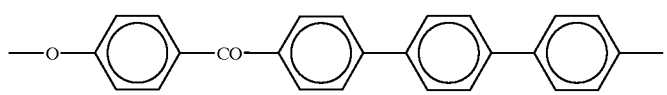
(13)
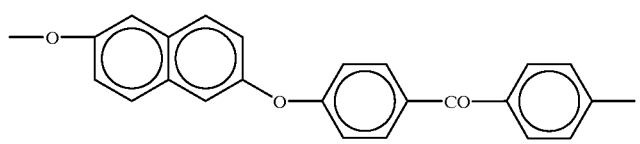
(14)
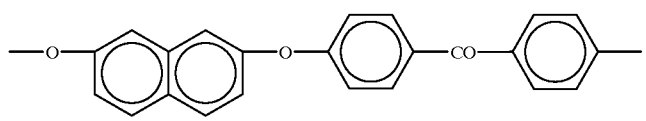
(15)
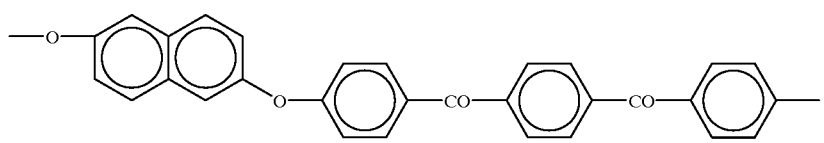
(16)

(17)

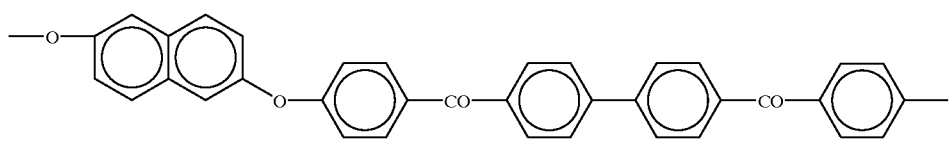

The aromatic polyether ketones of the present invention may be either homopolymers comprising the repeating units represented by one of the above formulae or copolymers comprising the repeating units represented by two or more of the above formulae. Further, the aromatic polyether ketones of the present invention may be mixtures of two or more of either homopolymers or copolymers.

The hydrogen atoms of the aromatic rings in the above repeating units may be partially or totally substituted by halogen atoms, nitro groups, nitrile groups, amino groups, phenoxy groups, phenyl groups, biphenyl groups, alkyl groups or the functional groups represented by formulae (18) through (22).

(18)

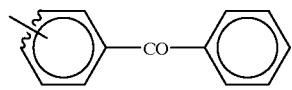

(19)

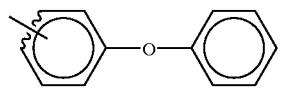

(20)

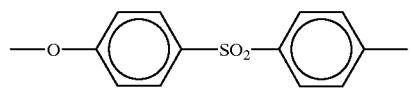

(21)

(22)

The aromatic polyether ketones of the present invention may be copolymers which partially contain other repeating units, for example, as represented by formulae (23) through (36) to such an extent that they do not degrade the intrinsic properties of the homopolymers or copolymers comprising repeating units represented by formulae (1) through (17).

(23)

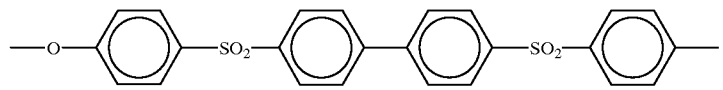

(24)

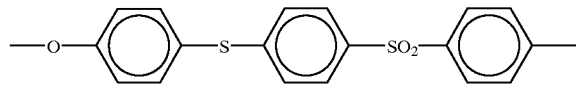

(25)

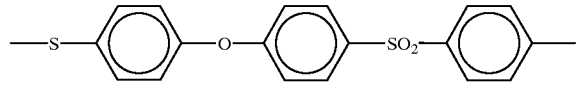

(26)

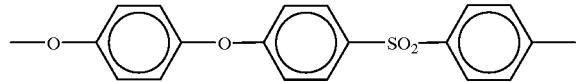

(27)

(28)

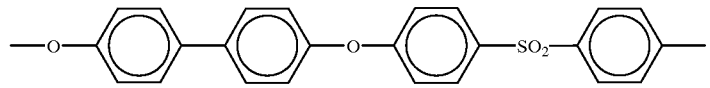

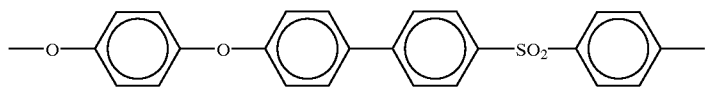

(29)

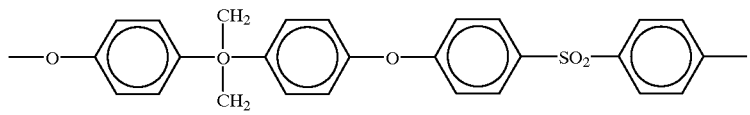

(30)

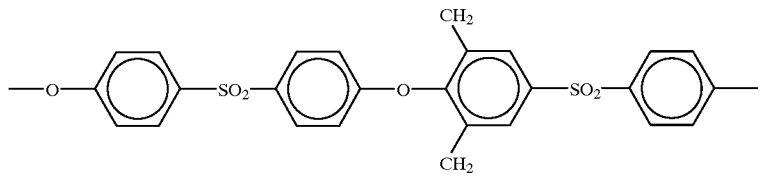

(31)

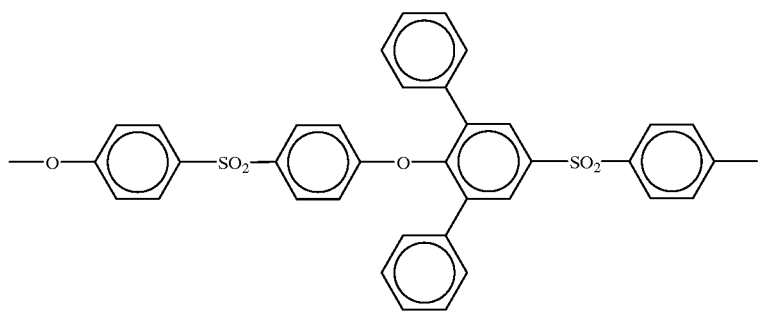

(32)

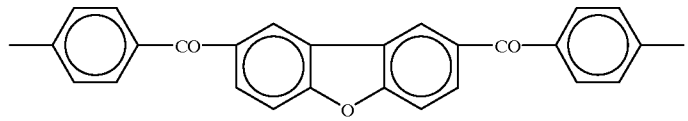

(33)

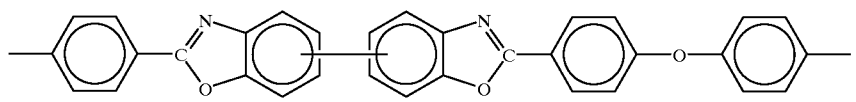

(34)

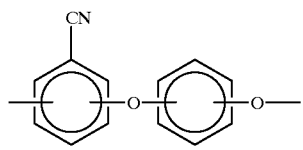

(35)

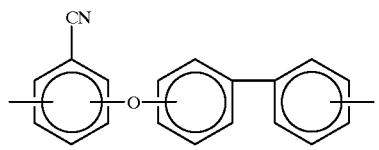

(36)

According to the present invention, the aromatic polyether ketones which comprise repeating units represented by formulae (1), (2), (3), (4) and (5) are respectively referred to as PEK, PEEK, PEKK, PEEKK and PEKEKK in order and may be preferably employed as materials for membrane production since they are commercially produced for easy procurement.

The aromatic polyether ketones of the porous membrane in the present invention are produced by known polymerization techniques which are not especially limited to specific ones, but the Friedel-Crafts process may be pointed out as an example. Relevant polymerization methods are described in U.S. Pat. Nos. 3,085,205, 3,442,857, 3,441,538 and 3,668,057 as well as DE-A-2206836 and *Poly. Soi.,* 741, 1961, USA. As production methods other than the above, there may be mentioned condensation polymerization methods, which include, for example, the polymerization between an aromatic dihalogen compound and a diphenol in the presence of an alkali salt and the polymerization of an aromatic dihalogen compound and a carbonate. The former method is described in JP-B-57-22938, U.S. Pat. No. 4,113,699 and JP-A-54-90296, and the latter method is described in JP-A-62-85708 and JP-A-62-85709.

According to the present invention, the aromatic polyether ketone of the porous membrane normally has a molecular weight of 0.5 dl/g or more in terms of reduced viscosity. If the aromatic polyether ketone has a reduced viscosity of less than 0.5 dl/g, the porous membrane is not suitable for practical use because of low mechanical strength. Further, the aromatic polyether ketones of the porous membrane in the present invention may have a crosslinking structure and may partially be insoluble with concentrated sulfuric acid. The porous membrane of the present invention tends to be further improved in heat resistance, chemical resistance, low elution characteristics and mechanical strength if the aromatic polyether ketone of the membrane has the crosslinking structure. Further, if the crosslinking structure is caused by a water-soluble organic solvent, the resulting membrane tends to have longer filtration life since the membrane is further improved in hydrophilic property, which alleviates membrane fouling, for example, brought about by proteins and the like. Notwithstanding, it is preferred that the aromatic polyether ketone is homogeneously dissolved without being crosslinked in the preparation of a membrane forming stock solution for the porous membrane of the present invention. The reduced viscosity of the aromatic polyether ketone normally ranges from 0.5 to 3.0 dl/g.

By the term "reduced viscosity" mentioned herein is meant the value obtained from measurements, at 25 degrees C. with an Ostwald viscometer, of a dilute solution prepared by dissolving an aromatic polyether ketone in 98 percent concentrated sulfuric acid so as to obtain 0.1 percent concentration of the aromatic polyether ketone solution (aromatic polyether ketone weight (g)/concentrated sulfuric acid volume (dl)). According to the present invention, the reduced viscosity of both aromatic polyether ketones for raw materials and those of the membranes is measured in the following manner. Fifteen milliliters of concentrated sulfuric acid having a concentration of ca. 98 percent is taken up with a pipette and 15.0 mg of an aromatic polyether ketone dried under vacuum at 150 degrees C. for 10–30 hours is homogeneously dissolved therein. The measurement of the thus prepared solution is carried out in a container of which the temperature is constantly maintained at 25 degrees C. The measurement is performed with an Ostwald viscometer which requires ca. 2 minutes for the measurement of concentrated sulfuric acid. The reduced viscosity of the aromatic polyether ketone, which has a structure vulnerable to sulfonation by concentrated sulfuric acid, should be measured immediately after the polyether ketone is homogeneously dissolved in the acid. With reference to the sulfonation of aromatic polyether ketones by concentrated sulfuric acid, when a concentrated sulfuric acid solution which is prepared for the measurement of the reduced viscosity of the polyether ketone is allowed to be left for a long time, for example, 2 days or more, especially 5 days or more, the value of the reduced viscosity is somewhat different from that obtained immediately after the solution is prepared.

Furthermore, if the aromatic polyether ketone of the porous membrane prepared according to the present invention has a crosslinking structure, its crosslinking ratio is preferably 99.99 percent or lower, more preferably 80 percent or lower. If the crosslinking ratio exceeds 99.99 percent, the mechanical strength of the membrane tends to degrade. The crosslinking ratio hereof is expressed as the percentage by weight of crosslinked component to the weight of the porous membrane and the percentage is obtained according to the following method. One gram of the porous membrane prepared according to the present invention is dried under vacuum at 120 degrees C. for 20 hours or longer and then weighed. The membrane is dissolved under agitation in 100 grams of 98 percent concentrated sulfuric acid at room temperature, normally at 25 degrees C. to prepare a solution, which is filtrated through a sintered glass filter to obtain insolubles. The obtained insolubles are washed with water and ethanol to remove sulfuric acid, dried at 120 degrees C. for 12 hours or longer and weighed. The crosslinking ratio of the porous membrane is obtained from the ratio of the weight of the dried insolubles to the total weight of the aforementioned dried porous membrane.

Furthermore, when the porous membrane of the present invention has a crosslinking structure, it is preferred that the membrane is crosslinked with a crosslinking agent. The crosslinking agent is especially preferred to be a water-soluble organic solvent having a solubility parameter ranging from 7 to 17. By the term "water-soluble organic solvent" mentioned herein is meant an organic solvent soluble in 100 grams of 25 degree C. water in a quantity of 0.1 gram or more. Examples of the water-soluble organic solvents which are particularly preferred as crosslinking agents and which have a solubility parameter within the above range include 1,4-butanediol, 1,3-butanediol, ethylene glycol, diethylene glycol, triethylene glycol, tetraethylene glycol, propylene glycol, dipropylene glycol, tripropylene glycol, glycerol, polyethylene glycol, polypropylene glycol, N,N-dimethyl formamide, N,N-dimethyl acetamide, N-methyl-2-pyrrolidone and mixtures thereof.

According to the present invention, the crosslinking by use of the above-mentioned organic solvent is preferred because said crosslinking tends to enhance the mechanical strength and the hydrophilic property of the resulting membrane and to lower the membrane fouling which results from its absorption of proteins and the like.

According to the present invention, when the aromatic polyether ketone of the porous membrane has a crosslinking structure, the location of crosslinked points is not especially restricted but, for example, such points may exist at the ends of the aromatic polyether ketone molecules or between the phenylene groups in the chains of said molecules. Further, when the aromatic polyether ketone of the porous membrane has a crosslinking structure, crosslinking is not particularly limited to the surface or the interior region thereof, but it is preferred that the membrane is uniformly crosslinked throughout the whole thereof from the viewpoint of improvement in properties such as mechanical strength.

According to the present invention, it is necessary that the aromatic polyether ketone of the porous membrane is not substantially sulfonated. By the term "not substantially sulfonated" used herein is meant that the ion exchange capacity of the aromatic polyether ketone is in the range of 0 to 0.5 meq./g. The ion exchange capacity of 0.5 meq./g corresponds to 19 molar percent content of the repeating units whose phenylene groups are monosulfonated, for example, in the aromatic polyether ketone which comprises the repeating units represented by formula (2). According to the present invention, the range of 0 to 0.1 meq./g is particularly preferred. An ion exchange capacity exceeding 0.5 meq./g is not preferred because the resulting membrane tends to degrade in heat resistance, chemical resistance and mechanical strength. The degree of sulfonation is measured by means of the elemental analysis of the sulfur content of the aromatic polyether ketone.

The aromatic polyether ketone of the porous membrane according to the present invention has a crystallinity of 10 percent by weight or more, particularly preferably 25 percent or more. If the crystallinity is less than 10 percent by weight, the resulting membrane is not preferred because its heat and chemical resistance are low. The crystallinity may be measured by means of the wide-angle X-ray diffractometry reported by Blundell and Osborn (Polymer, 24, 953, 1983) and is expressed as the ratio of the weight of crystallized aromatic polyether ketone to that of the porous membrane.

Further, the porous membrane of the present invention may contain a water absorbent polymer to such an extent that the polymer does not substantially degrade the primary properties of the aromatic polyether ketone such as heat resistance, chemical resistance, etc. or that the polymer does not deteriorate the membrane at the temperature at which the membrane is in practical use as a separation membrane. The water absorbent polymers refer to high molecular weight compounds which are water-soluble or have an equilibrium water absorption ratio of 3 percent or more when they are immersed in 25 degree C. water. Examples of the polymers include polyethylene glycol, polypropylene glycol, polyethyleneglycol alkylethers, polypropyleneglycol alkylethers, polyvinyl alcohol, polyvinyl alkylethers, dextrin, polyacrylic acid and its derivatives, polystyrene sulfonic acid and its derivatives, cellulose and its derivatives, ethylene-vinyl alcohol copolymer, polyvinyl pyrrolidone, aliphatic polyamide resins, aromatic polyamide resins, sulfonated polyether ether ketone, sulfonated polyether sulfone, and the mixtures thereof. The water absorbent polymer may be in a state of being blended within the porous membrane of the present invention or may be linked to the aromatic polyether ketone directly or through the above-mentioned crosslinking agent. In this way, even though a water absorbent polymer is contained in the porous membrane of the present invention, the increased hydrophilic property of the membrane has the effect of suppressing the absorption of proteins and the like to the membrane and thus tends to result in decreased fouling and increased membrane life, which is therefore desirable.

According to the present invention, the porous membrane of the aromatic polyether ketone has open pores having an average pore diameter ranging from 0.02 to 30.00 $\mu$m, preferably from 0.02 to 10.00 $\mu$m on both surfaces thereof. If the average pore diameter of the open pores on both surfaces of the porous membrane is less than 0.02 $\mu$m, the porous membrane is not preferred as a microfiltration membrane because its water permeability is lowered. If the average pore diameter exceeds 30.00 $\mu$m, the rejection ratio of particulates tends to be lowered though the water permeability tends to be increased. According to the present invention, the average pore diameters of the open pores on the surfaces of the porous membrane may be the same or different. Particularly if the average pore dimeters are different from each other, the balance of the water permeability and fractionating characteristics tends to be improved, which is preferable. Excellence in water permeability and fractionating characteristics generally means superiority in water permeability at a given rejection ratio for a high molecular weight compound having a given weight-average molecular weight or particulates having a given average particle size.

The open pores on the surfaces of the porous membrane prepared according to the present invention may be observed with a scanning electron microscope and their average pore diameter may be measured from the image of the pores in the micrographs thereof.

The form and configuration of open pores on the surfaces of the porous membrane prepared according to the present invention are not especially restricted. Examples of the forms of the open pores include circular, ellipsoidal, polygonal and slit-like forms. The configuration of the open pores is, for example, that of open pores formed among the aromatic polyether ketone fibrils which have a diameter of 10–300 nm and which form a three-dimensional network structure, open pores formed among fibrils which are linearly made up of aromatic polyether ketone particulates having a particle size of Ca. 10–200 nm (FIG. 5), open pores formed among congregated aromatic polyether ketone particulates having a particle size of ca. 10–200 nm (FIGS. 2 and 7), circular or ellipsoidal open pores existing on the flat surface of the aromatic polyether ketone (FIG. 3) or the like. Particularly, circular or ellipsoidal open pores are preferred because the membrane having the open pores tends to be less fouled.

The average pore diameter of the open pores on the surface of the membrane prepared according to the present invention is obtained according to a method which comprises cutting out the region of open pores shown in a scanning electron micrograph, obtaining the average area of the open pores from the weight of the region and the number of the open pores shown on the region, and obtaining the average pore diameter by regarding the open pores as perfect circles. Further, the average pore diameter may be also obtained from a xerographic copy of a scanning electron micrograph of membrane pores.

In accordance with the present invention, the observation of open pores on the surface of a membrane is carried out with a scanning electron microscope at a magnification of normally 500 times or more or a magnification of 5,000 times or more, 10,000 times particularly if the average pore diameter is 0.5 $\mu$m or less, and 20,000–100,000 times if the average pore diameter is 0.1 $\mu$m or less. When the average pore diameter is obtained, all of the open pores imaged are cut out from a photograph and measurements are performed after the magnification of the photograph or its xerographic copy is so adjusted that the cutout diameter of the open pore imaged region may range from 2 to 30 mm and the number of open pores may range from 10 to ca. 200 in that region. Further, if it is difficult to measure an average pore diameter according to the aforementioned cutting-out method because the membrane surface has a three-dimensional network structure, the average pore diameter is obtained by use of a photographic image processing technique.

In the present invention, the open pores are observed with a scanning electron microscope (S-900, a product of Hitachi, Ltd.) at an acceleration voltage of 1 kV. As the pretreatment of porous membrane specimens to be observed, water and other solvents of the surfaces and interior regions of the membrane specimens are substituted by t-butanol and then the membrane specimens are dried according to a t-butanol freeze-drying method. The freeze dried porous membrane specimens are firmly placed on a specimen table and are coated with Pt—Pd in a thickness of ca. 3.0 nm according to a magnetron spattering technique in order to use them as specimens for scanning electron microscopic observation.

The open pore ratio on both surfaces of the porous membrane in the present invention ranges from 7 to 90 percent, preferably from 10 to 85 percent, particularly preferably from 15 to 70 percent. If the open pore ratio is less than 7 percent, the water permeability of the porous membrane tends to be lowered and further, the balance of water permeability and fractionating characteristics thereof tends to be deteriorated. If the open pore ratio exceeds 90 percent, the balance of the water permeability and fractionating characteristics tends to be deteriorated as indicated by a tendency for increase in water permeability against a decrease in the rejection ratio of particulates. Further, the membrane surfaces tend to be damaged because of physical stimuli.

The open pore ratio is expressed as the percentage of total open pore area per unit area of membrane surface and may be obtained from the ratio of the total open pore area to the surface area of the membrane imaged in a scanning electron micrograph. If it is difficult to measure the open pore ratio according to the aforementioned cutting-out method because the membrane surfaces have a three-dimensional network structure, the open pore ratio is obtained by means of a photographic image processing technique.

The porous membrane of the present invention has an anisotropic structure. By the term "anisotropic structure" used in the present invention is meant that the pore diameters are not uniform in the direction of membrane thickness. According to the present invention, pore diameter variation in the direction of membrane thickness is not especially restricted. The anisotropic structure of the porous membrane prepared according to the present invention may be observed with a scanning electron microscope. The configuration of the membrane is, for example, that of a membrane wherein the diameters of pores increase from one surface of the membrane towards the other surface thereof, a membrane wherein the diameters of pores gradually lessen from one surface of the membrane towards the interior thereof and become minimum at a certain point from which the diameters become larger towards the other surface of the membrane, a membrane wherein the diameters of pores gradually increase from one surface of the membrane towards the interior thereof and become maximum at a certain point from which the diameters gradually taper towards the other surface thereof or a membrane which has interior voids having a diameter of 10 $\mu$m or larger in terms of perfect circles. Generally, a membrane which has pores uniform in diameter in the direction of the thickness thereof is inferior in the balance of water permeability and fractionating characteristics as compared with a membrane which has pores that are not uniform in diameter and tends to be lower than the latter membrane in water permeability if the two membranes are the same in fractionating characteristics.

In accordance with the present invention, it is preferred that the pore diameters of the pores inside the membrane are larger than the average pore diameter of open pores on either one of the surfaces of the membrane in order to better balance the water permeability and fractionating characteristics.

The form and configuration of the pores inside the porous membrane and the diameters of the pores on the cross section parallel with membrane surface may be observed and measured in the image of the cross section vertical to the membrane surface in a scanning electron micrograph. The configuration of the pores inside the porous membrane according to the present invention is normally that of spheres, ellipsoids, polyhedrons, what are generally referred to as drops or fingers extending from the vicinity of one membrane surface towards the other surface with increasing diameters, or slits. The structure of the membrane with interior pores is that of a honeycomb in which respective cells have microporous walls (FIG. 6), a three-dimensional network comprising aromatic polyether ketone fibrils having a diameter of 10–800 nm among which pores are formed, a network comprising strings of aromatic polyether ketone fibrillar particulates having a particle size of ca. 10–800 nm (FIG. 8), a honeycomb or three-dimensional network as described above but formed around interior voids, or an array of cylindrical pores which pass through said membrane with their openings on both membrane surfaces and whose diameters gradually become larger inwards. According to the present invention, if the membrane interior has a three-dimensional network or voids structure or both, the water permeability thereof tends to be increased, which is desirable. The term "voids" in the present invention means pores having a converted diameter of 10 $\mu$m or more. The term "converted diameter" herein means the diameter which is obtained as a result of regarding the area of the pore image in the cross section of a membrane in a scanning electron micrograph as that of a perfect circle.

If the membrane of the present invention has voids therein, the diameter of the voids ranges preferably from 10 $\mu$m to the membrane thickness minus 10 $\mu$m and normally from 10 $\mu$m to 200 $\mu$m.

If the membrane has a three-dimensional network structure or voids therein, the membrane tends to be high in water permeability. If the membrane has a three-dimensional network structure, the membrane is increased in mechanical strength, while particularly if the membrane has elongated ellipsoidal or finger-like voids extended in the direction of membrane thickness, the membrane has advantages such as high mechanical strength under pressure and the like, so that the membrane is especially preferred in filtration under high pressure. Further, if the walls of voids have a porous structure which comprises spherical pores or pores formed in a fibrillar network structure, water permeability is increased, which is desirable.

In accordance with the present invention, if the membrane has a three-dimensional network structure or honeycomb structure, the diameter of the pores ranges normally from 0.005 to 10 $\mu$m.

If the maximum value R of the average pore diameter of the pores in a cross section parallel with a membrane surface is larger than any of the average pore diameters of the pores on respective membrane surfaces, it is preferred that R is in the range expressed as $1.5r \leq R \leq 10,000r$, wherein r is the smaller one of the two average pore diameters in respect of the membrane surfaces.

When the average pore diameter of the pores within a membrane is worked out, it is obtained by averaging the diameters of at least five pores on a cross section parallel with a membrane surface. The diameters of pores inside the membrane are calculated based upon the image, in a scanning electron micrograph, of the cross section which is vertical to the membrane surface and which is obtained by a generally known freeze slicing technique. Referring to the preparation of the specimens for measurements on the cross section of a membrane in the present invention, the porous membrane wet with water which is gradually substituted with 50–100 percent ethanol is dehydrated, placed in a gelatin capsule with its residual ethanol and freeze sliced to obtain a sliced membrane. The ethanol of the sliced membrane is substituted with t-butanol. Then, the sliced membrane is dried according to a t-butanol freeze-drying technique. Consecutively, the sliced membrane is firmly placed on a specimen table with carbon paste and is coated with Pt—Pd in a thickness of ca. 8.0 nm by means of a magnetron spattering technique after being provided with conductivity to obtain the specimens.

In accordance with the present invention, for example, when the whole image of the cross section across a membrane is observed in a scanning electron micrograph, the cross section is photographed so that the boundaries, which correspond to the surfaces of the membrane, between the image and space in the micrograph may be in parallel with the longitudinal direction of the micrograph and so that the width of said image may occupy 50–98 percent of the width of the micrograph. In this case, the magnification of the image in the scanning electron micrograph ranges from 100 to 10,000 times, but this depends upon the membrane thickness. If it is impossible to observe the pores in the aforesaid manner because the pores are extremely fine in the image of a membrane cross section, partial enlargement of said image will make it possible to observe the form, configuration and the diameters of the pores on a surface of the cross section parallel with the membrane surface.

In the present invention, when the diameters of the pores on the cross section parallel with the surface of a membrane are worked out, the average pore diameter of the pores is obtained by drawing a straight line (a curved line in case of a hollow fiber) in parallel with the boundary between an image of the section vertical to the membrane surface and the margin in a scanning electron micrograph, calculating the respective diameters of normally at least five pores through which said line passes in said image in terms of those of perfect circles and averaging their values.

The porous membrane of the present invention has a porosity of normally 10–96 percent and preferably 30–90 percent. If the porosity is less than 10 percent, water permeability tends to be lowered and if the porosity exceeds 96 percent, mechanical strength tends to be lowered, which is not preferred. The porosity is expressed as the percentage of pore volume to the total volume of a membrane and is obtained according to a specific gravity method or the like.

The porous membrane of the present invention has one of the aforesaid structures and is extremely excellent in the balance of water permeability and fractionating characteristics.

The porous membrane of the present invention has a water flux of 100–20,000 $l/m^2 \cdot hr \cdot kg/cm^2$, particularly preferably 1,000–10,000 $l/m^2 \cdot hr \cdot kg/cm^2$ for practical use. If the water flux of a membrane is lower than 100 $l/m^2 \cdot hr \cdot kg/cm^2$, the membrane is not preferable as a filtration membrane for the intended uses, for example, the purification of condensed water at power plants because of low water permeability. If the water flux of a membrane is in excess of 20,000 $l/m^2 \cdot hr \cdot kg/cm^2$, the membrane undesirably tends to be lowered in fractionating characteristics and particulate rejection effectiveness. The water flux is obtained by measuring the volume of the water resulting from the passage of 25 degree C. distilled water through the membrane at a pressure of 1 $kg/cm^2$ for 10 minutes and calculating the volume in terms of the above-mentioned unit.

The porous membrane of the present invention is extremely excellent in fractionating characteristics as well, for example, the membrane with a water flux of 30,000 $l/m^2 \cdot hr \cdot kg/cm^2$ rejects 95 percent or more of 0.1 $\mu$m SB latex particulates.

The porous membrane of the present invention has a thickness ranging from 20 to 2,000 $\mu$m.

The form of the porous membrane in the present invention is not especially restricted but is normally that of a flat sheet, hollow fiber or capillary membrane. However, it is preferred that the form of the porous membrane is that of a hollow fiber membrane because of advantages such as larger filtration area with smaller space occupied in practical use, prolonged service life resulting from plugging control by means of a cross-flow filtration technique or the like. The hollow fiber membrane has an outside diameter normally ranging from 100 to 10,000 $\mu$m.

If the porous hollow fiber membrane of the present invention is employed for filtration, the feed liquid may be passed through the membrane from the outer surface to the inner surface thereof or may be passed through the membrane in the other direction. It is preferred to control the average open pore diameters and average open pore ratios of the outer and inner surfaces of the hollow fiber membrane according to the direction of passing a feed liquid through the membrane and the intended use thereof.

Hereinafter, a process for preparing the porous membrane of the present invention will be described and illustrated.

The porous membrane of the present invention may be prepared according to a wet process. The wet process comprises forming a homogeneous solution which is composed of a polymer and a solvent as major components into a desirable shape and immersing the shaped solution in a non-solvent against the polymer, thereby coagulating the shaped solution to obtain the porous membrane. Generally the wet process is applied to numerous polymers and is described in many literatures (Synthetic Polymer Membranes, a Structual Perspective 2nd Edition, R. R. Kesting, J. Wiley and Sons).

The process of the present invention, wherein a homogeneous solution basically composed of an aromatic polyether ketone and a strong acid or a homogeneous solution basically composed of an aromatic polyether ketone, a strong acid and a thickening agent is used as a membrane forming stock solution, comprises step A of forming said stock solution into a desirable shape, step B of immersing the shaped solution in a coagulation liquid, step C of taking out a shaped membrane from the coagulation liquid and washing the membrane and step D of heat stabilizing the membrane.

The membrane forming stock solution used in the process of the present invention will be described hereinbelow.

The membrane forming stock solution of the present invention comprises an aromatic polyether ketone and a strong acid or an aromatic polyether ketone, a strong acid and a thickening agent as major components, and additives and/or the like may be added thereto, if necessary, in order to control the performance of the resulting porous membrane.

An indispensable condition in the present invention is that the membrane forming stock solution must be in the neighborhood of a mircophase separation.

The term "microphase separation" mentioned in the present invention refers to a suspended state in which the stock solution in a homogeneous state is separated into polymer rich and poor phases, with one of the phases being dispersed as microfine particles in the other phase. The microphase separation may take place when a non-solvent or poor solvent such as water against an aromatic polyether ketone is added in extremely small increments to a membrane forming stock solution in which solutes are uniformly dissolved or when the temperature of said stock solution is lowered.

The state in the neighborhood of the microphase separation described in the present invention refers to that of a membrane forming stock solution which achieves a microphase separation either when 0.01–3 parts by weight, preferably 0.05–2 parts by weight of water having a temperature equal to that of the stock solution is added to 100 parts by weight of the stock solution or when the temperature of the stock solution is lowered within the range of 15 degrees C., preferably within the range of 10 degrees C. Accordingly, in order to make the stock solution one which is in the neighborhood of the microphase separation, it is important to accurately control the ratio of each of the components and the temperature of said stock solution.

In accordance with the present invention, methods to make the stock solution one which is in the neighborhood of the microphase separation are not limited to any particular ones, but examples of the methods include changing the concentration of a strong acid by adding a non-solvent or poor solvent such as water against an aromatic polyether ketone but compatible with said strong acid to the stock solution, changing the kind and amount of an additive to be added to the stock solution, changing the kind and amount of a thickening agent to be added to the stock solution, changing the temperature of the stock solution, the combination thereof and the like.

The composition of the stock solution in the present invention normally comprises 4–25 parts by weight of an aromatic polyether ketone, 30–96 parts by weight of a strong acid, 0.1–50 parts by weight of a thickening agent and 0–25 parts by weight of an additive per 100 parts by weight of the stock solution at a temperature of 0–50 degrees C. but is not restricted to these ranges. In this case, 100 parts by weight of the strong acid used above may contain 15 parts by weight or less of water.

The strong acids used for the stock solution of the present invention may be those which substantially do not react with an aromatic polyether ketone, which can dissolve at least 4 percent by weight of the polyether ketone and which do not sulfonate the polyether ketone in the preparation of the stock solution and step A. Examples of these strong acids include sulfuric acid, methanesulfonic acid, fluoromethanesulfonic acid, difluoromethanesulfonic acid, trifluoromethanesulfonic acid, dichloromethanesulfonic acid, dichloroacetic acid, trichloroacetic acid, trifluoroacetic acid, liquid hydrogen fluride and mixtures thereof. Among them, sulfuric acid is preferred from a handling viewpoint. Referring to aromatic polyether ketones such as PEEK, PEEKK, etc. having the structures which are easily sulfonated by sulfuric acid, the sulfonation of the polyether ketones may be prevented either by the method of using a strong acid other than sulfuric acid or a mixture of the acid and sulfuric acid. If sulfuric acid is used alone as a strong acid, the sulfonation may be prevented by the method of keeping the stock solution at a temperature of 15 degrees C. or lower, preferably 8 degrees C. or lower and more preferably 5 degrees C. or lower in the preparation of the stock solution and step A. The latter method is preferred since sulfuric acid is easy to handle.

The form of the aromatic polyether ketone used according to the present invention is not especially restricted but is that of pulverulent bodies, pellets, flakes or ground particles which are commercially available. Normally, the pulverulent bodies or pellets may preferably be employed. The pulverulent bodies are especially preferred since the dissolving rate is accelerated. The pulverulent bodies include the powder resulting from polymerization and the powder obtained by grinding the pelletized extrudate of melt extrusion, either of which may preferably be employed. If the aromatic polyether ketone to be used is moist or wet, it tends to be difficult to prepare a membrane forming stock solution having such a composition that may give rise to the condition that the stock solution is in the neighborhood of a microphase separation. Consequently, it is preferred to sufficiently dry the aromatic polyether ketone before the polyether ketone is dissolved. Drying methods are not limited to particular ones but the polyether ketone is dried at a temperature of normally 120–250 degrees C., preferably 150–230 degrees C. for 2 hours or longer. In addition, it is more preferred to further dry the polyether ketone under vacuum.

The thickening agents used according to the present invention are employed in order to control the viscosity of the membrane forming stock solution and the performance of the resulting membrane and include water-soluble or water-insoluble inorganic compounds, high molecular weight compounds or their oligomers and the like. Examples of the thickening agents which may be used according to the present invention include inorganic compounds such as microfine particulates of silica and the like which give a thixotropic property to the resulting membrane forming stock solution and high molecular weight compounds such as polyvinyl pyrrolidone, polyethylene glycol, polyvinyl alcohol and its derivatives, polyacrylic acid and its derivatives, polystyrene sulfonic acid and its derivatives, sulfonated polyether ether ketone, polyether sulfone, polysulfone, sulfonated polyether sulfone, polyether imide and mixtures thereof or oligomers thereof. Among them, polyvinyl pyrrolidone and polyethylene glycol are preferred. When the thickening agent is added to a membrane forming stock solution, it is preferred that the thickening agent is used after the amount of the moisture absorbed in said agent is ascertained or after said agent is sufficiently dried.

According to the present invention, inorganic compounds, low molecular weight organic compounds or the like may be added to a membrane forming stock solution as additives in order to control the performance of the resulting membrane. The inorganic compounds such as various salts may be used and examples of the low molecular weight organic compounds which may be employed include diphenylsulfone, 4,4'-dichlorodiphenyl sulfone, 2,4'-dichlorodiphenylsulfone, 4,4'-difluorodiphenyl-sulfone, 2,4'-difluorodiphenylsulfone, 2,2'-difluorodiphenyl-sulfone, benzophenone, 4,4'-dichlorobenzophenone, 2,4'-dichlorobenzophenone, 4,4'-difluorobenzophenone, 2,4'-difluorobenzophenone, 2,2'-difluorobenzophenone, 4,4'-difluoroterephthalophenone, 2,4'-difluoroterephthalophenone, 4,4'-dichloroterephthalophenone, 2,4'-dichloroterephthalophenone, N,N-dimethylformamide, N,N-dimethylacetamide, dimethylsulfoxide, N-methylpyrrolidone, xanthone, terephthalic acid, isophthalic acid, salicylic acid, 1,4-butanediol, 1,3-butanediol, ethyleneglycol, diethyleneglycol, triethyleneglycol, tetraethyleneglycol, propyleneglycol, ethyleneglycol monomethylether, diethyleneglycol monomethylether, triethyleneglycol monomethylether, tetraethyleneglycol monomethylether, ethyleneglycol dimethylether, diethyleneglycol dimethylether, triethyleneglycol dimethylether, tetraethyleneglycol dimethylether, ethyleneglycol monoethylether, diethyleneglycol monoethylether, triethyleneglycol monoethylether, tetraethyleneglycol monomethylether, ethyleneglycol diethylether, diethyleneglycol dimethylether, triethyleneglycol diethylether, tetraethyleneglycol dimethylether, ethyleneglycol monoisopropylether, diethyleneglycol monoisopropylether, triethyleneglycol monoisopropylether, tetraethyleneglycol monoisopropylether, ethyleneglycol diisopropylether, diethyleneglycol diisopropylether, triethyleneglycol diisopropylether, tetraethyleneglycol diisopropylether, ethyleneglycol monophenylether, diethyleneglycol monophenylether, triethyleneglycol monophenylether, tetraethyleneglycol monophenylether, ethyleneglycol diphenylether, diethyleneglycol diphenylether, triethyleneglycol diphenylether, tetraethyleneglycol diphenylether, propyleneglycol diphenylether, glycerol and the like.

These thickening agents and additives may be dispersed in the stock solution in a microfine state or may be modified with a strong acid to such an extent that they do not have any bad effect on the performance of the resulting membrane.

The membrane forming stock solution used according to the present invention may be prepared by dissolving an aromatic polyether ketone, if necessary, together with an additive and a thickening agent under vacuum or under an inert gas in a closed system at a temperature ranging from the stock solution freezing point plus 2 degrees C. to 80 degrees C. while carrying out agitation so that the stock solution does not absorb moisture in the atmosphere. The membrane forming stock solution used according to the present invention is inclined to absorb moisture in the atmosphere owing to the use of sulfuric acid which is hygroscopic. Further, if the stock solution is prepared in an open system, the absorption of atmospheric moisture brings about the microphase separation of the stock solution in some cases because said stock solution is in the neighborhood of microphase separation. There is no particular problem if the solution preparation temperature is in the aforementioned range, but the temperature ranges normally from the stock solution freezing point plus 2 degrees C. to 15 degrees C. and preferably from the freezing point plus 2 degrees C. to 6 degrees C. if sulfuric acid is used as a strong acid and if an aromatic polyether ketone such as PEEK is used which has a structure that is easily sulfonated. Further, if the aromatic polyether ketone to be used tends to be sulfonated during the preparation of a membrane forming stock solution, it is advantageous to lower the temperature of the stock solution as mentioned above, while accelerating the dissolving rate of the polyether ketone by grinding the particles of the polyether ketone into smaller ones.

In accordance with the present invention, the method of feeding the respective components is not especially restricted when a membrane forming stock solution is prepared. For example, the components may be added to a strong acid having a given concentration to obtain a desirable ratio of the components or a homogeneous stock solution may be first prepared at a component ratio which deviates from the neighborhood of microphase separation and then water, an additive and/or a thickening agent are added thereto in small increments to achieve the condition that the stock solution is in the neighborhood of microphase separation.

Furthermore, it is preferred to deaerate the membrane forming stock solution of the present invention for the removal of the dissolved gases therein and to remove the insolubles therein such as gels and the like from said stock solution before step A. If the stock solution contains the dissolved gases in large quantities, the resulting porous membrane tends to have pinholes on its surface and if the stock solution contains insolubles such as gels, the resulting porous membrane tends to concurrently have pinholes and regions that are locally low in mechanical strength. For these reasons, it is difficult to obtain a membrane which is excellent in fractionating and mechanical characteristics. Deaeration methods are not limited to particular ones but vacuum methods or centrifugal separation methods are preferably employed for the deaeration purpose. Methods for removing insolubles are not limited to specific ones as well, but normally filtration or centrifugal separation is preferably applied to the removal thereof.

Hereinafter, steps A and B will be described in accordance with the order of the steps in the present invention.

According to the present invention, a membrane forming stock solution is formed into a desirable shape (step A) and then the formed solution is immersed in a coagulation liquid to coagulate said formed solution (step B).

The membrane formation of step A may be carried out by means of a known technique when the porous flat-sheet membrane or porous hollow fiber membrane of the present invention is prepared. For example, in the preparation of a flat-sheet membrane, a membrane forming stock solution is normally applied to a support or extruded through a slit die to form said stock solution. On the other hand, in the preparation of a hollow fiber membrane, a coaxial double-tube die is used, through an annular orifice of which a membrane forming stock solution is extruded and through the bore of which a bore injection coagulant such as a liquid or gas is passed at the same time.

Following the formation of the stock solution, step B proceeds which comprises immersing the formed solution in a coagulation liquid and coagulating said solution.

Step B constitutes a remarkable feature in the production process of the present invention.

In the present invention, unless the formed solution is contacted with the vapor of the coagulation liquid before step B as explained hereinafter, it is necessary to use the following coagulation liquid.

That is to say, if a membrane forming stock solution comprises an aromatic polyether ketone and a strong acid as major components, it is necessary to employ a coagulation liquid which is lower than water in coagulation capacity.

If a membrane forming stock solution comprises an aromatic polyether ketone, a strong acid and a thickening agent as major components, it is necessary to use a coagulation liquid which is lower than water in coagulation capacity as a poor solvent and/or a coagulation liquid which has a low capacity of dissolving said thickening agent. If the form of the membrane is that of a hollow fiber membrane, the bore injection coagulant which is used in step A is equivalent to the aforesaid coagulation liquid which is indispensable.

According to the present invention, the coagulation liquids which are lower than water in coagulation capacity refer to those which are slower than water in whitening rate from the immersion of a formed stock solution in a 25 degree C. coagulation liquid until the complete whitening of said solution due to coagulation when the yellowish brown stock solution which is prepared by homogeneously dissolving an aromatic polyether ketone in 98 percent sulfuric acid so that the concentration of said polyether ketone may become 10 percent by weight is applied to a glass plate in a thickness of 100 μm on said plate in the form of a flat sheet and is immediately, normally within 10 seconds, immersed in said coagulation liquid. The coagulation liquids which are lower than water in coagulation capacity include, for example, inorganic compounds such as sulfuric acid having a concentration of 85 percent or lower, nitric acid, phosphoric acid and the like and water-soluble organic solvents. Examples of the water-soluble organic solvents include acetone, N-methyl-2-pyrrolidone, dimethyl formamide, dimethyl acetamide, dimethyl sulfoxide, tetrahydrofuran, alcohols such as ethyleneglycol, diethyleneglycol, triethyleneglycol, propyleneglycol, dipropyleneglycol, glycerol, ethanol, propanol, butanol, pentanol, hexanol and the like and aqueous solutions thereof, liquid high molecular weight compounds such as polyethyleneglycol, polypropyleneglycol, polyvinyl pyrrolidone and the like or aqueous solutions thereof and mixtures thereof. Further, the coagulation liquids may contain high molecular weight compounds such as polyethyleneglycol, polypropyleneglycol, polyvinyl pyrrolidone and the like.

According to the present invention, the coagulation liquids which have a low capability of dissolving a thickening agent refer to those which cannot dissolve 50 grams or more of the thickening agent per 100 grams of said liquids at 25 degrees C. If polyvinyl pyrrolidone is used as a thickening agent, examples of the coagulation liquids include acetone, glycol alkylethers such as ethyleneglycol alkylethers, diethyleneglycol alkylethers, triethyleneglycol alkylethers and the like, and mixtures thereof.

When the hollow fiber membrane of the present invention is prepared, the coaxial multi-tube dies used according to the present invention are not limited to particular ones but coaxial double-tube dies, coaxial triple-tube dies, coaxial quadruple-tube dies and the like may be employed for this purpose. For example, if a hollow fiber membrane is prepared with a coaxial double-tube die by use of a coagulation liquid having a very low coagulation capacity among the coagulation liquids as a bore injection coagulant, an annular hollow fiber membrane is not obtained in some cases. Presumably, the hollow fiber membrane tends to be deformed when the membrane is contacted with spinning direction change guides after its immersion in a coagulation bath provided below the die since the extremely slow coagulation rate brings about the incomplete coagulation of the membrane interior which results in its insufficient mechanical strength. If a hollow fiber membrane is prepared under such a condition, it is preferred to use, for example, a coaxial triple-tube die or coaxial quadruple-tube die. When the hollow fiber membrane of the present invention is prepared with a coaxial triple-tube die, it is desirable that a membrane forming stock solution is extruded through the outermost annular orifice thereof, while passing the aforementioned coagulation liquid through the secondly outer annular orifice thereof to first contact said liquid with said stock solution with the concurrent injection of a poor solvent or a non-solvent such as water or the like which has a coagulation capacity higher than said coagulation liquid into the bore of said die. Further, when a coaxial triple-tube die is employed, it is advantageous to contact the aforementioned coagulation liquid with the inside wall of the stock solution annularly extruded for a longer time by designing said die in order to have such a structure that the core nozzle is extended downward longer than the outermost annular orifice for extruding said stock solution and the secondly outer annular orifice for passing said coagulation liquid.

The form and volume of a vessel, generally called a coagulation bath in which a membrane forming stock solution is immersed to prepare the porous membrane of the present invention, are not especially restricted if the concentration of the coagulation liquid therein does not vary largely in the course of spinning. The outer and inner surfaces of the hollow fiber membrane tend to be damaged if the membrane is contacted with guides and the like when its mechanical strength is insufficient owing to the use of a bore coagulant having a very low coagulation capacity. In this case, it is preferred to use, for example, a coagulation bath which has a distance long enough to sufficiently coagulate the membrane for the purpose of extending the coagulation time. The coagulation bath is a deep coagulation bath which has a distance of 1 m or longer before the membrane is brought into contact with a guide and the like or a tubular coagulation bath in which a hollow fiber membrane may be immersed while flowing a coagulation liquid therein. In the latter, the form of the tubular coagulation bath is not especially restricted but it is preferred that the tubular coagulation bath is in the form of a U-shaped tube or U-shaped tubes connected with each other. The U-shaped tube coagulation bath may provide a hollow fiber membrane with a distance sufficient for the coagulation thereof under the condition that the membrane is not contacted with guides such as rollers except for the coagulation liquid within said bath after being extruded from a die.

According to the present invention, it is preferred that a formed stock solution is brought into contact with the vapor of a coagulation liquid between steps A and B and is consecutively immersed in said coagulation liquid in order to obtain a porous membrane having open pores on its surfaces, high water permeability and excellent fractionating characteristics.

The two coagulation liquids, one being used for the vapor which is brought into contact with a formed stock solution, and the other being used for the immersion of said formed stock solution after contact with said vapor, may be the same or different.

The coagulation liquids which are effectively used as vapor are not limited to particular ones if the liquids are capable of bringing a membrane forming stock solution into phase separation. Examples of the liquids which may preferably be used include water, alcohols, ketones such as acetone, ethers and mixtures thereof.

The coagulation liquids which are used for the immersion of the formed stock solution after contact with the vapor are not limited to particular ones if the liquids are compatible with the strong acid used and which are non-solvents such as water and the like or poor solvents against the aromatic polyether ketone. Generally, it is preferred to use solvents having a coagulation capacity lower than water as coagulation liquids in order to obtain membranes having high water flux.

According to the present invention, the time of contacting the vapor with the formed stock solution is not especially restricted if it is in such a range that desirable membrane performance is obtainable, but it normally ranges from 0.1 second to 2 hours if the form of the stock solution is that of a flat-sheet membrane. If the form of the stock solution is that of a flat-sheet membrane, the methods of contacting the vapor with the surface thereof are not limited to specific ones. Examples of the methods include allowing the formed stock solution to stand in a controlled vapor, for example, in highly humid air for a given period, spraying steam on the stock solution and the like.

If the form of a stock solution is that of a hollow fiber membrane, the outer surface of said solution is contacted with the aforesaid vapor to achieve the present invention from the extrusion of the solution in the form of a hollow fiber until the immersion thereof in a coagulation bath placed below a die. In this case, the methods of contacting the vapor with the stock solution in the form of a hollow fiber include exposure of the vapor to the outer surface of the formed stock solution extruded from a die by use of a nozzle or the like and contact of the vapor, which is emitted from the surface of the coagulation liquid in a coagulation bath by raising the temperature of the coagulation bath, with the outer surface of the stock solution. Particularly in the latter, a method is preferably applied which comprises setting up a cylindrical enclosure, what is generally called a "chimney", so that the extruded stock solution may be encompassed with said enclosure between a die and a coagulation bath placed below said die and uniformly contacting the vapor emitted from said bath with the outer surface of said solution.

The temperature of a coagulation liquid for immersing a formed solution after contact with vapor is not especially restricted but ranges normally from the freezing point of the used stock solution or the freezing point of the used coagulation liquid plus 2 degrees C., which is higher, to 120 degrees C. For example, if water is used as a coagulation liquid after contact of water vapor with the surface of a formed stock solution, the temperature of the water ranges from 0 to 98 degrees C., preferably from 40 to 60 degrees C., and a die for extruding the stock solution is provided at a desirable height from the surface of the coagulation liquid, which may achieve the present invention.

In accordance with the present invention, step B is followed by step C in which a residual strong acid is washed away from the resulting membrane after taking out said membrane from a coagulation liquid. Step C will be described hereinafter.

From a coagulated porous membrane, the strong acid, additive, thickening agent, coagulation liquid and the like which remain in the membrane are washed away to such an extent that no problems occur in the following steps or in practical use thereof for filtration.

In general, the porous membrane which is immersed in a coagulation liquid is taken out from the liquid and then washing is started in a condition that the liquid is on the membrane surfaces. According to a normal washing method, the residual strong acid and the like are washed away by use of an aqueous solvent or a solvent comprising water as a major component at a temperature ranging from room temperature to the boiling point of water. Normally water or an alkaline water is preferably used as a washing solvent. If the form of the porous membrane is that of a hollow fiber membrane, it is also advantageous to pass the washing solvent through the bore of said membrane.

If a small amount of a strong acid remains in the membrane even after the aforementioned washing step, it is desirable to wash the membrane with an organic solvent. As organic solvents, normally used are methanol, ethanol, propanol, acetone, methylethyl ketone, ethylene glycol, diethylene glycol, triethylene glycol, dimethylformamide, dimethylacetamide and the like. The temperature of the organic solvents used for the washing is not especially restricted but normally ranges from room temperature to 120 degrees C. If a thickening agent and additive insoluble in an aqueous solvent are employed, it is also desirable to wash the membrane with the aforesaid organic solvents.

Residuals such as a thickening agent and the like are allowed to remain in the membrane, if they are not eluted from the membrane in the course of filtration.

If the porous membrane which is prepared according to the present invention by use of polyvinyl pyrrolidone is employed for such a use that the residual polyvinyl pyrrolidone may not be allowed to elute from the membrane during filtration even in extremely small quantities, it is advisable to decompose and wash away the residual polyvinyl pyrrolidone from said membrane with a hypochlorite such as sodium hypochlorite after the aforementioned washing. In this case, the concentration and temperature of a hypochlorite and the time for the washing therewith are not especially restricted, but the concentration ranges from 100 to 50,000 ppm, the temperature ranges from 5 to 95 degrees C. and the time ranges from 1 to 500 hours. Further in this case, it is advantageous to sufficiently make the porous membrane hydrophilic beforehand by immersing it in a water-soluble organic solvent such as ethanol or the like.

The membrane prepared as mentioned above is normally a porous membrane of an amorphous, aromatic polyether ketone which has a crystallinity of less than 10 percent by weight and is generally low in heat resistance. According to the present invention, step D of heat stabilization is essential so as to obtain a highly effective porous membrane of the crystalline aromatic polyether ketone which has a crystallinity of 10 percent by weight or higher and preferably 25 percent by weight or higher by performing the heat treatment of the aforementioned amorphous, porous membrane.

Step D of heat stabilization will be described hereinafter.

The heat stabilization (step D) of the present invention is not especially restricted if it is a method which increases the crystallinity of the aromatic polyether ketone making up a porous membrane up to 10 percent by weight or higher, preferably 25 percent by weight or higher.

Examples of the heat stabilization methods include heating the porous membrane at a temperature between the glass transition point of the aromatic polyether ketone used for membrane preparation and the melting point thereof, heat treating the porous membrane in the presence of a plasticizer or swelling agent at the melting point or lower of the aromatic polyether ketone used for membrane preparation, heat treating the porous membrane in the presence of a heat stabilizing solvent at a temperature between the glass transition point and the melting point while keeping said membrane in the wet condition, and the like.

In accordance with the present invention, it is preferred to heat treat the porous membrane in the presence of a heat stabilizing solvent at a temperature between the glass transition point of the aromatic polyether ketone used for membrane preparation and the melting point thereof while keeping said membrane in a wet condition after step C of washing because a highly heat-stabilized membrane may be obtained which is not deteriorated in filtration at high temperatures and which has high crystallinity.

The wet condition mentioned in the present invention refers to the condition wherein the porous membrane is wet with the above-mentioned washing solvent, the heat stabilizing solvent mentioned hereinafter or the like. In more detail, it refers to the condition wherein the open pores on the surface of the porous membrane and the pores inside said membrane are covered with the aforementioned washing solvent, the undermentioned heat stabilizing solvent or the like or the condition wherein the membrane is wholly immersed in the solvent. The wet condition is achieved by applying or atomizing the solvent to the surface of the porous membrane, impregnating the solvent into the membrane or immersing the membrane in the solvent. For example, a desirable wet condition according to the present invention is the condition wherein the membrane is uniformly coated with, impregnated with or immersed in a quantity of the solvent which is 0.5, preferably 2, and more preferably 10 times or more that of the membrane by weight, depending on the porosity of the membrane and the specific gravity of the solvent used for achieving the wet condition. In the present invention, if the porous membrane deviates from the wet condition, the water permeability and heat stability of the membrane are degraded when the membrane is employed for filtration.

According to the present invention, it is preferred to enter into step D while keeping the wet condition in step C and thereafter.

In the heat stabilization (step D) of the present invention, if the temperature of the heat treatment is lower than the glass transition point of the aromatic polyether ketone used for membrane preparation, the resulting porous membrane is inferior in heat stability at high temperatures, while if the temperature exceeds the melting point thereof, the membrane will be melted or intensively deformed. The temperature of the heat treatment ranges from the glass transition point plus 20 degrees C. to the melting point minus 20 degrees C. and more preferably from the glass transition point plus 50 degees C. to the melting point minus 50 degrees C. The particularly preferred temperature of the heat treatment ranges from 180 to 320 degrees C., although this depends upon the structure of the aromatic polyether ketone used for membrane preparation.

The glass transition point and melting point of each aromatic polyether ketone are measured with a differential scanning calorimeter (DSC) while raising the temperature at a rate of 10 degrees C. per minute.

In the heat stabilization (step D) of the present invention, it is preferred to constantly maintain the membrane in the wet condition during the heat treatment.

The heat stabilizing solvents which are employed according to the present invention are not limited to specific ones, if the solvents are those which are used for making the porous membranes in the wet condition during the heat treatment, which do not dissolve the aromatic polyether ketones and which are stable without suffering deterioration such as intensive decomposition and the like in the course of the heat treatment.

Among them, the solvents which have solubility parameters ranging from 7 to 17, preferably from 8 to 14, particularly preferably from 8 to 13 are used as the heat stabilizing solvents of the present invention. If solvents having solubility parameters outside the range of 7 to 17 are used as heat stabilizing solvents, the water permeability of the resulting porous membrane is remarkably lowered and the heat stability thereof also tends to be degraded.

The solubility parameter according to the present invention is denoted by the following formula:

$$\text{solubility parameter} = (\Delta E_v/V)^{1/2}$$

wherein $\Delta E_v$ is molar evaporation energy, nearly equal to $\Delta H - RT$ wherein $\Delta H$ is vapor heat, R is the gas constant and T is absolute temperature, and V is the molar volume of a solvent.

Solubility parameters are described in many scientific literatures and books. Particularly, "Polymer Data Handbook, Basic Edition", compiled by The Society of Polymer Science, Japan and published by Baifukan Co., Ltd. has tables on solubility parameters by solvent, so that a decision may be made on the choice of the heat stabilizing solvents suitable for the present invention.

Other literatures giving considerations to solubility parameters include *Ind. Chem. Prod. Res. Dev.* 8, Mar. 1969, p.2–11, *Chemical Reviews,* 75(1975), p.731–753, and *Encyclopedia of Chemical Technology,* 2nd Edition, Supplemental Volume (1971), p.889–910.

Examples of the heat stabilizing solvents used according to the present invention include alcohols such as methanol, ethanol, n-propanol, n-butanol, isobutanol, sec-butyl alcohol, t-butyl alcohol, n-pentanol, n-hexanol, 2-ethylbutanol, n-octanol, ethyl hexanol, 1-dodecanol, 3,5,5,-trimethyl hexanol, cylohexanol, methyl isobutylcarbinol, n-amyl alcohol, allyl alcohol, lauryl alcohol, benzyl alcohol, furfuryl alcohol, n-heptanol, 1,4-butanediol, 1,3-butanediol, 2,3-butanediol, ethylene glycol, diethylene glycol, triethylene glycol, tetraethylene glycol, propylene glycol, dipropylene glycol, tripropylene glycol, tetraethylene glycol, neophenyl glycol, 1,5-pentanediol, 2,4-pentanediol, 2,5-pentanediol, glycerol, polyethylene glycol, polypropylene glycol and the like, ethers such as dimethyl ether, diethyl ether, ethyl methyl ether, isopropyl ether, dipropyl ether, diisopropyl ether, butyl ether, dibenzyl ether, dihexyl ether, diamyl ether, ethyl isobutyl ether, methyl isobutyl ether, diacetone alcohol methyl ether, dichloroethyl ether, diphenyl ether, ethyleneglycol monomethyl ether, diethyleneglycol monomethyl ether, triethyleneglycol monomethyl ether, tetraethyleneglycol monomethyl ether, propyleneglycol monomethyl ether, ethyleneglycol dimethyl ether, diethyleneglycol dimethyl ether, triethyleneglycol dimethyl ether, tetraethyleneglycol dimethyl ether, propyleneglycol dimethyl ether, ethyleneglycol monoethyl ether, diethyleneglycol monoethyl ether, triethyleneglycol monoethyl ether, tetraethylene glycol monomethyl ether, propyleneglycol monoethyl ether, ethyleneglycol diethyl ether, diethyleneglycol dimethyl ether, triethyleneglycol diethyl ether, tetraethyleneglycol dimethyl ether, propyleneglycol diethyl ether, ethyleneglycol monoisopropyl ether, diethyleneglycol monoisopropyl ether, triethyleneglycol monoisopropyl ether, tetraethyleneglycol monoisopropyl ether, propyleneglycol monoisopropyl ether, ethyleneglycol diisopropyl ether, diethyleneglycol diisopropyl ether, triethyleneglycol diisopropyl ether, tetraethyleneglycol diisopropyl ether, propyleneglycol diisopropyl ether, ethyleneglycol monophenyl ether, diethyleneglycol monophenyl ether, triethyleneglycol monophenyl ether, tetraethyleneglycol monophenyl ether, propyleneglycol monophenyl ether, ethyleneglycol diphenyl ether, diethyleneglycol diphenyl ether, triethyleneglycol diphenyl ether, tetraethyleneglycol diphenyl ether, propyleneglycol diphenyl ether, methyl-2-pentanediol-1,3, methyl-2-pentanediol-2,4, ethylhexanediol-1,3 and the like, acetals such as 1,4-dioxane, furan, furfural, tetrahydrofuran and the like, esters such as methyl acetate, ethyl acetate, n-propyl acetate, isopropyl acetate, n-butyl acetate, isobutyl acetate, sec-butyl acetate, n-amyl acetate, isoamyl acetate, sec-amyl acetate, vinyl acetate, allyl acetate, methylamyl acetate, butyl stearate, methyl formate, ethyl formate, propyl formate, n-butyl formate, isobutyl formate, n-amyl formate, isoamyl formate, methyl butyrate, ethyl butyrate, isobutyl butyrate, n-butyl butyrate, propyl butyrate, isopropyl isobutyrate, methyl propionate, ethyl propionate, butyl propionate, propyl propionate, ethyl lactate, methyl lactate, n-butyl lactate, methyl benzoate, ethyl benzoate, ethyl acrylate, methyl acrylate, methyl methacrylate, ethyl methacrylate, butyl methacrylate, methyl isobutyrate, ethyl isobutyrate, dimethyl phthalate, diethyl phthalate, dipropyl phthalate, dibutyl phthalate, dimethyl oxalate, diethyl oxalate, dimethyl sebacate, diethyl sebacate, dibutyl sebacate, dioctyl sebacate, butyrolactone, caprolactone, methyl caprolactone, propiolactone, dioctyl phthalate and the like, ketones such as acetone, methyl ethyl ketone, methyl propyl ketone, methyl n-butyl ketone, methyl amyl ketone, diethyl ketone, diisobutyl ketone, diisopropyl ketone, methyl isoamyl ketone, ethyl amyl ketone, methyl isobutyl ketone, methyl isopropyl ketone, methyl nonyl ketone, cyclopentanone, cyclobutanedione, methylcyclohexanone, acetophenone, diacetone alcohol, mesityl oxide, acrolein, benzophenone, chlorobenzophenone, dichlorobenzophenone, difluorobenzophenone, fluorobenzophenone, hydroxybenzophenone, dihydroxybenzophenone, difluoroterephthalophenone, dichloroterephthalophenone, dihydroxyterephthalophenone and the like, aldehydes such as acetaldehyde, benzaldehyde, butylaldehyde and the like, hydrocarbons such as hexane, heptane, octane, cyclohexane, decane, methyl cyclohexane, tetrahydronaphthalene, benzene, toluene, xylene, styrene, ethyl benzene, n-propyl benzene, cyclopentane and the like, halogenated hydrocarbons such as methyl chloride, methylene chloride, trichloromethane, carbon tetrachloride, ethyl chloride, ethylidene chloride, methyl iodide, ethyl iodide, benzene iodide, bromobenzene, chlorobenzene, dichlorobenzene, trichlorobenzene and the like, fatty acids and phenols such as formic acid, acetic acid, butyric acid, maleic acid, propionic acid, acetic anhydride, propionic anhydride, succinic anhydride, maleic anhydride, acrylic acid, methacrylic acid, phenol, m-cresol, bisphenol A and the like, nitrogen compounds such as nitromethane, nitroethane, nitropropane, nitrooctane, nitrobenzene, methylamine, ethylamine, diethylamine, triethylamine, butylamine, dibutylamine, tributylamine, amylamine, ethylenediamine, N,N-dimethyl nitroamine, triethylene tetramine, formamide, N-methyl formamide, N-ethyl formamide, methyl acetamide, N-ethyl acetamide, N,N-dimethyl formamide, N,N-dimethylacetamide, N,N-diethyl acetamide, tetramethyl oxyamide, hexamethyl phosphorylamide, aniline, dimethyl aniline, acetonitrile, chloroacetonitrile, n-butyronitrile, benzonitrile, capronitrile, propionitrile, acrylonitrile, malononitrile, n-valeronitrile, quinoline, morpholine, N-ethyl morpholine, N-acetyl morpholine, N-formyl morpholine, α-pyrrolidone, N-methyl-2-pyrrolidone, pyridine, piperidine, N-acetyl piperidine, N-formyl piperidine, N-acetyl piperidine, N,N-diacetyl piperazine, hydrazine, phenyl hydrazine, ε-caprolactam and the like, carbonates such as dimethyl carbonate, diethyl carbonate, methyl ethyl carbonate, diphenyl carbonate, methyl phenyl carbonate, ethyl phenyl carbonate and the like, sulfur compounds such as methyl ethyl sulfone, tetramethylene sulfone, dimethyl sulfide, carbon disulfide, methyl tetramethylene sulfone, methyl propyl sulfone, dimethyl sulfone, dimethyl sulfoxide, dimethyl tetramethylene sulfone, diethyl sulfone, sulfolane, thiophene, dipropyl sulfone, diphenyl sulfone, difluorodiphenyl sulfone, dichlorodiphenyl sulfone, dihydroxydiphenyl sulfone and the like, phosphorus compounds such as dibutylphenyl phosphate, tricresyl phosphate, triphenyl phosphite, hexamethylphosphoric triamide and the like, and mixtures thereof.

Of the aforesaid heat stabilizing solvents, particularly preferred for use are 1,4-butanediol, 1,3-butanediol, ethylene glycol, diethylene glycol, triethylene glycol, tetraethylene glycol, propylene glycol, dipropylene glycol, tripropylene glycol, glycerol, polyethylene glycol, polypropylene glycol, N,N-dimethyl formamide, N,N-dimethyl acetamide, N-methyl-2-pyrrolidone and mixtures thereof. If polyethylene glycol or polypropylene glycol is used as a heat stabilizing solvent according to the present invention, each weight average molecular weight is not particularly limited but ranges preferably from 100 to 2,000.

Some of the aforementioned heat stabilizing solvents are solid at the temperature of the heat treatment. The solid heat stabilizing solvent may be employed as a component of the solution consisting of said solvent and one or more of the other heat stabilizing solvents which are liquid at that temperature.

The time of the heat treatment in the present invention is not especially restricted but is in the range of generally 5 seconds to 100 hours, preferably 10 minutes to 50 hours, more preferably 1 to 2 hours.

The heat treatment in the heat stabilization (step D) of the present invention may be carried out in an open system or a closed system in which an autoclave or the like is employed. In the open system, the porous membrane which is immersed in the heat stabilizing solvent is in some cases deformed or damaged on the surfaces thereof because of the intense evaporation of the heat stabilizing solvent during the heat treatment. In the method of applying the heat stabilizing solvent to the porous membrane, if the membrane is heat treated with an oven or the like, attention must be paid so that the membrane does not deviate from the wet condition owing to the evaporation of the solvent.

When the heat treatment of the present invention is performed, the atmosphere of the heat stabilizing solvent may be the air or an inert gas such as nitrogen, argon, helium or the like. If oxygen in the air has such an influence that it degrades the water permeability or fractionating characteristics of the resulting porous membrane because oxygen deteriorates the heat stabilizing solvent during the heat treatment, it is preferred that the heat treatment is carried out under an inert gas.

Furthermore, when the heat treatment is carried out by use of the heat stabilizing solvent in step D of the heat stabilization according to the present invention, it is preferred that the residual low boiling point solvents are removed from the porous membrane prior to said treatment according to necessity. The residual low boiling point solvents herein mean the solvents which remain in the porous membrane as a result of their use in steps A through C. These low boiling point solvents normally have a boiling point of 140 degrees C. or lower and are classified into organic and inorganic solvents. Example of the organic solvents include methanol, ethanol, propanol, acetone, methyl ethyl ketone and the like, whereas examples of the inorganic solvents include water, dilute sulfuric acid, aqueous sodium hydroxide, aqueous sodium hypochlorite and the like. If the low boiling point solvents remain in the porous membrane at the time of the above-mentioned heat treatment, the boiling of the solvents during the heat treatment tends to cause the deformation of the membrane and pinholes on the membrane surface and as a result, the membrane tends to be unstable in separation performance.

The substantial removal of the residual low boiling point solvents means the condition that the bubbles of the low boiling point solvents do not appear on the surface of the porous membrane in the course of the heat treatment.

The methods of substantially removing the low boiling point solvents from the porous membrane are not limited to specific ones if the membrane does not deviate from the wet condition, but it is preferred to substitute them with high boiling point solvents which do not boil at the temperature of the heat treatment. Above all, it is preferred to substantially remove the low boiling solvents from the porous membrane by means of substituting the low boiling point solvents with a portion of the heat stabilizing solvents which are used for the heat treatment. The substituting methods are not limited to specific ones but it is preferred to substitute the low boiling point solvents with heat stabilizing solvents by applying the heat stabilizing solvents to the membrane for impregnation or by immersing the membrane in the heat stabilizing solvents under the condition that the low boiling point solvents are not boiled in the membrane. The temperature of the application or immersion normally ranges from 20 to 140 degrees C. Further, the time of the application or immersion is not especially restricted if the time is in such a range that the low boiling point solvents may substantially be removed, but the time normally ranges from 1 minute to 100 hours and preferably from 30 minutes to 50 hours. Further, in the immersion method, the immersion of the membrane may be carried out under the temperature and pressure condition that the residual low boiling point solvents do not boil in the membrane, for example, under pressure or under vacuum in the closed system of an autoclave or the like.

Furthermore, according to the present invention, the low boiling point solvents which still remain in the porous membrane after they are substituted with the heat stabilizing solvent by means of impregnation or the like as mentioned above may be removed by drying, for example, with a dryer, an oven or the like to such an extent that the membrane may not deviate from the wet condition because of the evaporation of the heat stabilizing solvent.

Further, in the heat stabilization (step D) of the present invention it is preferred to impregnate a high molecular weight compound into the porous membrane prior to the heat treatment as a pretreatment according to necessity. The impregnation of the membrane with the high molecular weight compound tends to decrease the difference between the water permeability of the membrane before and after the heat treatment.

The impregnation of the porous membrane with the high molecular weight compound means the existence of the high molecular weight compound in the membrane, especially in the open pores on the surface of the membrane and the wall surface of the open pores.

The high molecular weight compounds are not limited to specific ones if they are not decomposed at temperatures not less than the glass transition point of the aromatic polyether ketone, especially at the temperature of the heat treatment, if they do not chemically affect the polyether ketone and if they are removable from the membrane with a solvent after the heat treatment. Examples of the high molecular weight compounds which may be employed for the aforesaid purpose include polyethylene glycol, polypropylene glycol, polyvinyl pyrrolidone, polyvinyl alcohol, cellulose and the derivatives thereof, polyethylene, polypropylene, polyester, polyacrylonitrile, polymethyl methacrylate, polystyrene, polycarbonate, ethylenevinyl alcohol copolymer, polyamide, polyarylate, polysulfone, polyether sulfone, polyether imide, sulfonated polyether ether ketone, sulfonated polyether sulfone and the derivatives thereof. Among the aforesaid compounds, polyethylene glycol, polypropylene glycol, polyvinyl pyrrolidone and polyvinyl alcohol and the like may be preferably employed.

The molecular weight of the high molecular weight compounds is not especially restricted but compounds whose weight-average molecular weight ranges from 200 to 1,000,000 and preferably from 200 to 100,000 are preferably used.

The quantity of the high molecular weight compound used for the porous membrane is not especially restricted but normally ranges from 0.1 to 300 parts by weight per 100 parts by weight of the membrane, depending upon the open pore ratio of the membrane, the pore diameter of the open pores on the membrane surfaces and the specific gravity of the compound.

The methods of impregnating the membrane with the high molecular weight compound are not limited to particular ones. Examples of the methods which are preferred include immersing the membrane in a solution of the compound, immersing the membrane in the liquid compound, applying or spraying a solution of the compound or the liquid compound directly to the membrane, polymerizing a monomer or an oligomer which is impregnated into the membrane in advance by means of a polymerization technique and the like. Among these aforementioned methods, the method of immersing the membrane in a solution of the high molecular weight compound or the liquid high molecular weight compound to impregnate the membrane with the solution or the liquid compound is preferred. Particularly, the method of immersing the membrane in a solution of the high molecular weight compound is most preferred because the compound can be uniformly and quickly impregnated into the membrane under a low viscous condition.

The temperature of impregnating the membrane with the high molecular weight compound according to the aforementioned method is not especially restricted, if the compound can be impregnated into the membrane, if the solvent of the high molecular weight compound solution does not boil and if the temperature is lower than the glass transition point of the aromatic polyether ketone. The impregnation of the membrane with the aforementioned compound is normally performed at a temperature of room temperature to 140 degrees C. In this case, attention should be paid so that the aforementioned low boiling point solvents which remain in the membrane do not boil and evaporate from the membrane surface. If the solvent of the high molecular weight solution boils in the membrane or if the low boiling point solvent intensively evaporates from the surface of the membrane, there is the possibility of membrane deformation and emergence of pinholes on the membrane surface. As a result, it is not possible to obtain a porous membrane which is stable in fractionating characteristics.

The impregnation of the membrane with the high molecular weight compound may be performed in the atmosphere or under an inert gas. Further, it is also possible to carry out the above-mentioned impregnation under vacuum or under pressure for the deaeration purpose, because the impregnation of the membrane with the high molecular weight compound tends to be difficult if the membrane contains bubbles after the washing (step C).

The time of the impregnation of the membrane with the high molecular weight compound, for example, the time of immersing the membrane in a solution of the compound, is not especially restricted but normally ranges from 10 seconds to 50 hours.

When the membrane is impregnated with the high molecular weight compound, it is preferred that the solvent used for dissolving said compound is the heat stabilizing solvent. It is not preferred from the viewpoint of productivity to employ a solvent other than the heat stabilizing solvent since the solvent remaining within the membrane must be substituted with the heat stabilizing solvent at the time of the heat treatment. Further, the concentration of the high molecular weight compound solution is not especially restricted but the quantity of the high molecular weight compound normally ranges from 1 to 1,000 parts by weight per 100 parts by weight of the solvent.

If the low boiling point solvents are substantially removed from the porous membrane as a result of impregnating the membrane with the high molecular weight compound, the step of removing the low boiling point solvents may be omitted.

It is preferred to maintain the membrane in the wet condition during the impregnation of said membrane with the high molecular weight compound. If the membrane deviates from the wet condition, the water permeability of the resulting membrane tends to be lowered.

The porous membrane thus obtained according to the present invention may be subjected, if necessary, to post treatment which includes, for example, a washing treatment of removing the heat stabilizing solvent, the high molecular weight compound and the like which remain in the membrane, a maintenance treatment for keeping the membrane in the wet condition until the membrane is actually used for filtration, and the like.

In the washing treatment, for example, it is desirable to employ a solvent which is capable of dissolving both the heat stabilizing solvent and the high molecular weight compound remaining in the membrane in order to remove the heat stabilizing solvent and the compound. Examples of the solvents which are preferably used are water or organic solvents such as alcohols, ketones, ethers, amides and the like. The temperature of the washing treatment is not especially restricted but normally ranges from room temperature to 180 degrees C. However, it is undesirable that the washing treatment is carried out under the condition that the solvent boils as in washing under reflux since deformation of the membrane and damage of the membrane surface tend to occur.

In the maintenance treatment, the methods for keeping the membrane in the wet condition include immersion of the membrane in the heat stabilizing solvent, formalin, water, a mixture thereof or the like, impregnation of the membrane with one of these liquids and application of one of these liquids to the membrane.

If the use of a solvent as the heat stabilizing solvent does not cause any problems in employing the resulting membrane for separation, the aforesaid washing and maintenance treatment may be omitted. Examples of the heat stabilizing solvents include glycerol, ethylene glycol, diethylene glycol, triethylene glycol, tetraethylene glycol, propylene glycol, dipropylene glycol, tripropylene glycol, polyethylene glycol, polypropylene glycol and mixtures thereof, depending upon the field in which the resulting membrane is used for filtration.

As explained above, highly heat stabilized, crystalline, porous membranes may be obtained by means of the heat stabilization in which the heat treatment is carried out by use of the heat stabilizing solvent while maintaining the membrane in the wet condition in step C and thereafter.

According to the present invention, the membrane may be stretched in any one of the steps after step A.

The porous membrane thus obtained according to the present invention may be preferably employed under severe conditions such as use for filtration in water having a temperature exceeding 180 degrees C. because it is highly heat stabilized. It is possible to use the the membrane of the present invention in a smaller membrane area as compared with the membrane of the conventional melt processes since the membrane is excellent in water permeability and the balance of water permeability and fractionating characteristics. If the membranes of the present invention and those resulting from a conventional melt process are the same in water permeability, the membrane of the present invention efficiently removes finer particulates.

Furthermore, the porous membrane of the present invention is excellent in low elution characteristics and radiation resistance and is therefore preferably employed not only in applications in which organic or inorganic substances are eluted from conventional membranes into the filtrate thereof but also where radioactive material-containing liquids are subjected to filtration treatment.

BEST MODE FOR CARRYING OUT THE INVENTION

Figure 1:
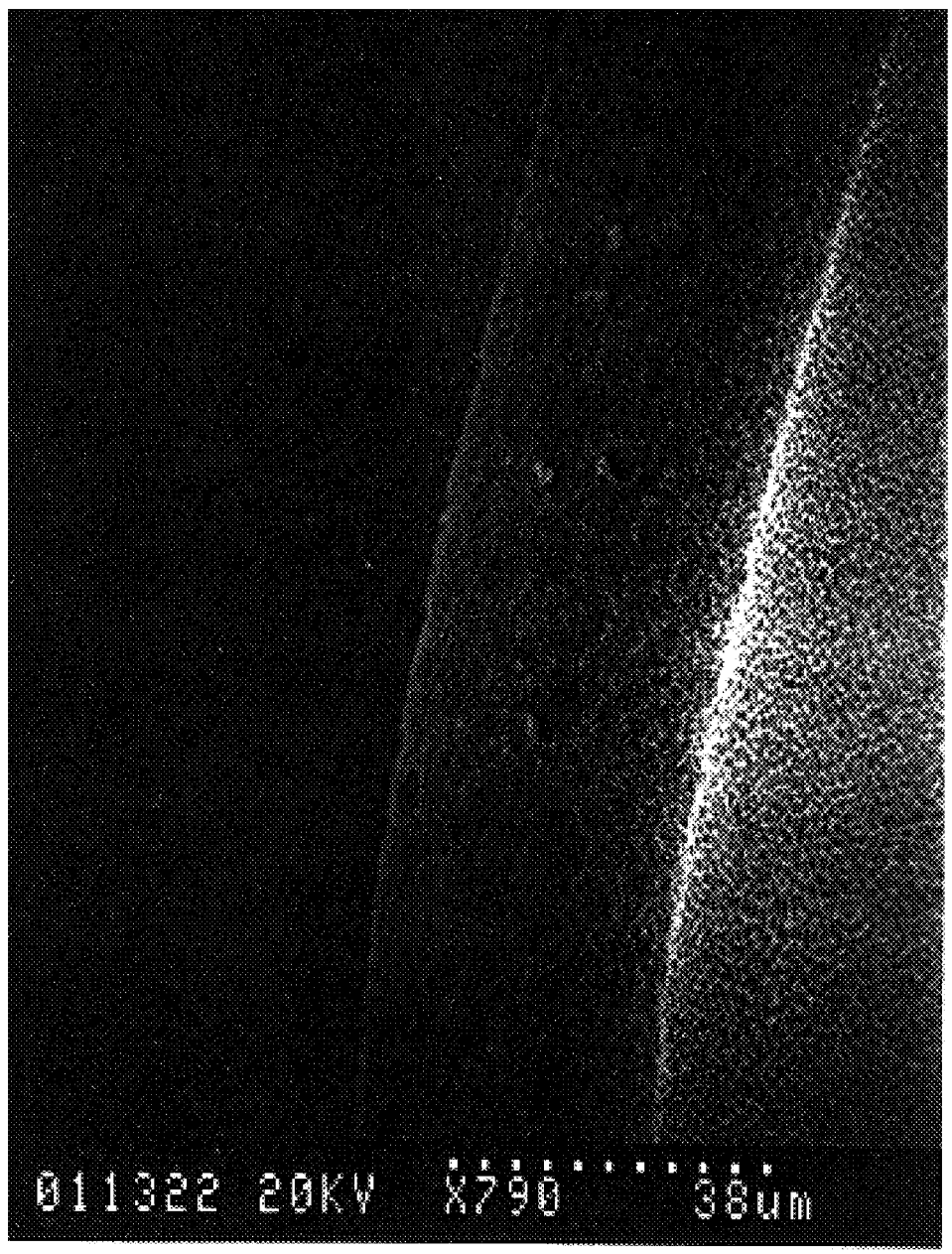
FIG. 1 is a scanning electron micrograph (×790) which shows the cross section and the surface of the porous flat-sheet membrane obtained in Example 1 of the present invention.
Figure 2:
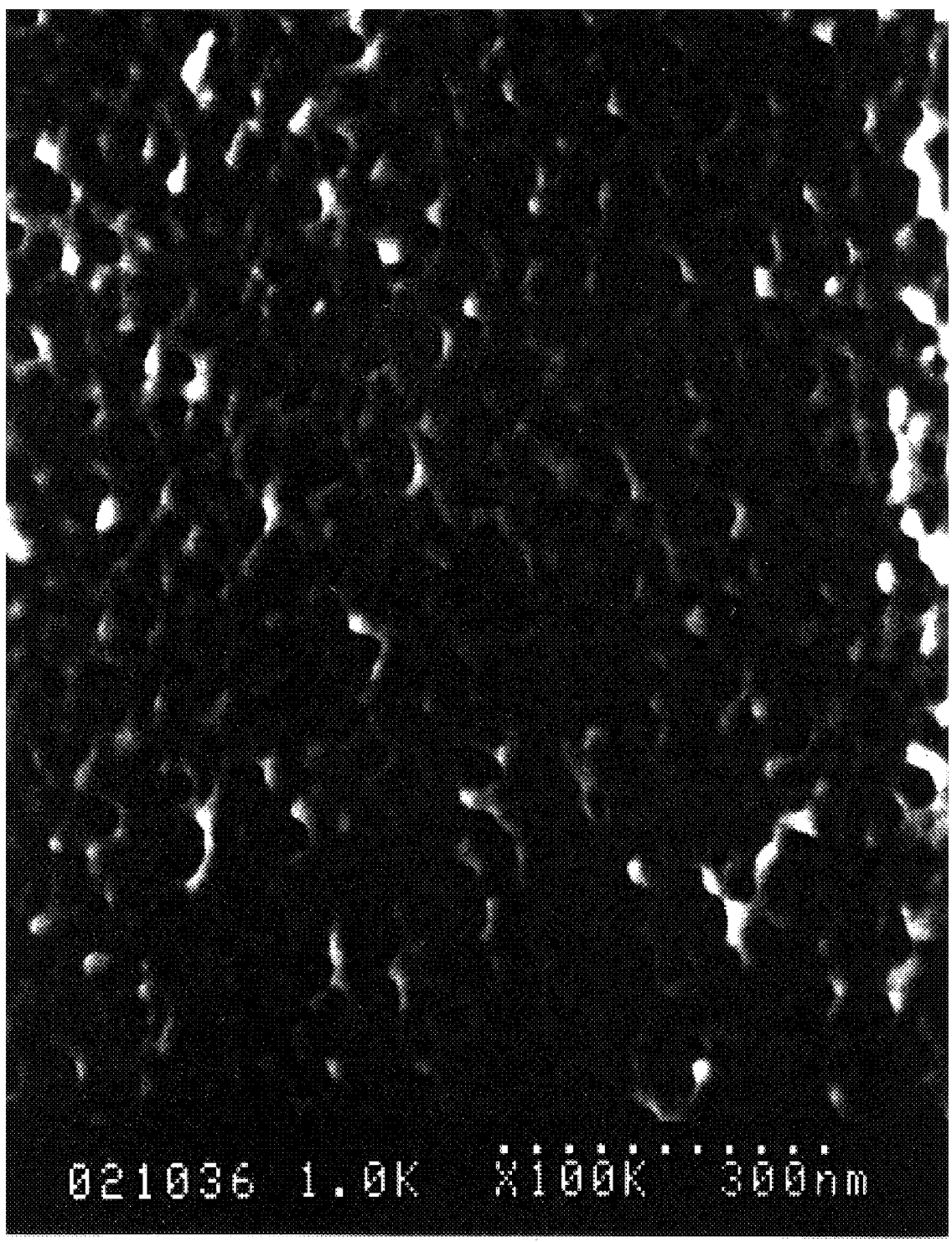
FIG. 2 is a scanning electron micrograph (×10,000) which shows the surface of the porous flat-sheet membrane prepared in Example 5 of the present invention, said surface being in contact with a coagulation liquid when said membrane was immersed in said liquid.
Figure 3:
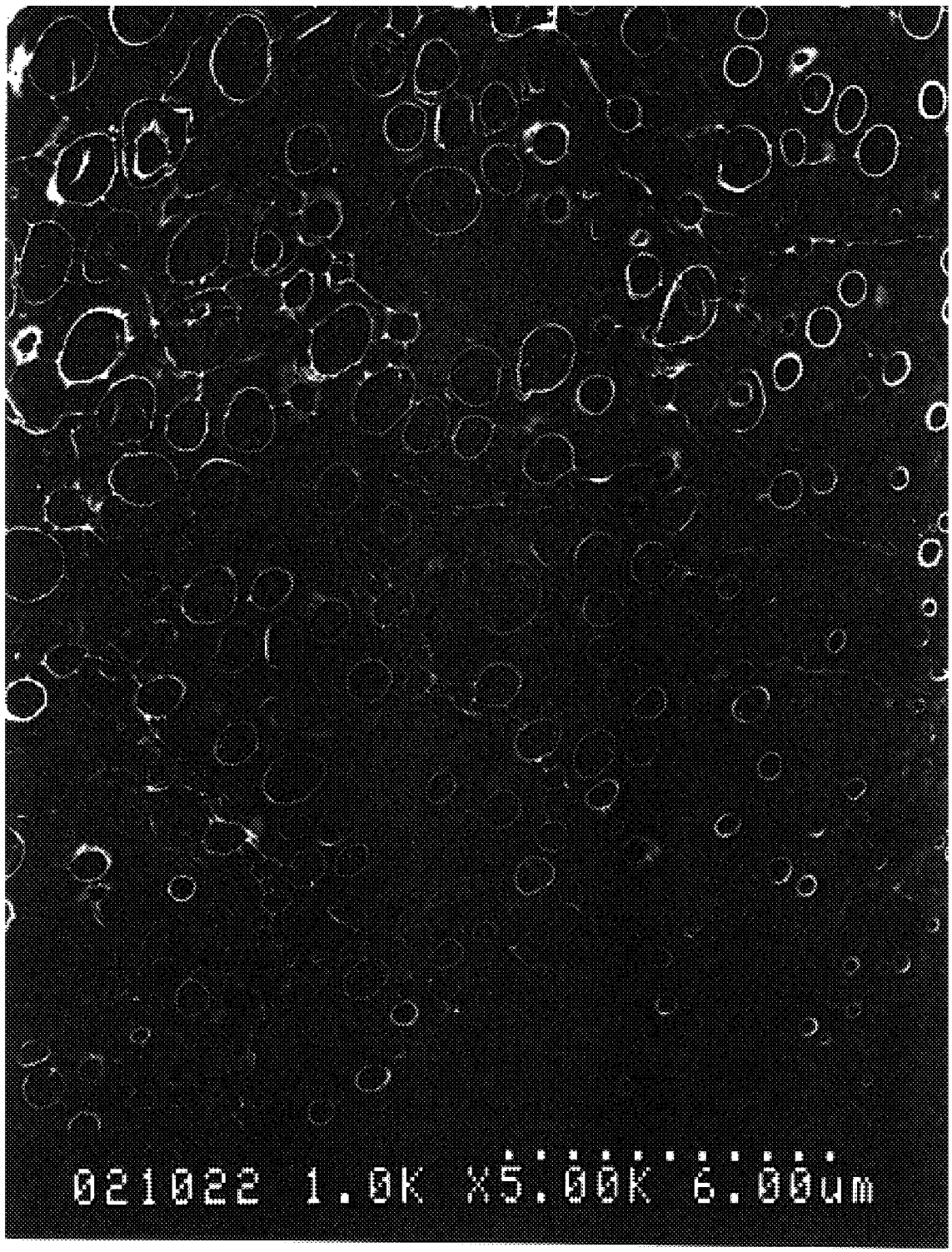
FIG. 3 is a scanning electron micrograph (×5,000) showing the surface of the porous flat-sheet membrane prepared according to Example 5 of the present invention, said surface being in contact with a glass plate when said membrane was immersed in said liquid.
Figure 4:
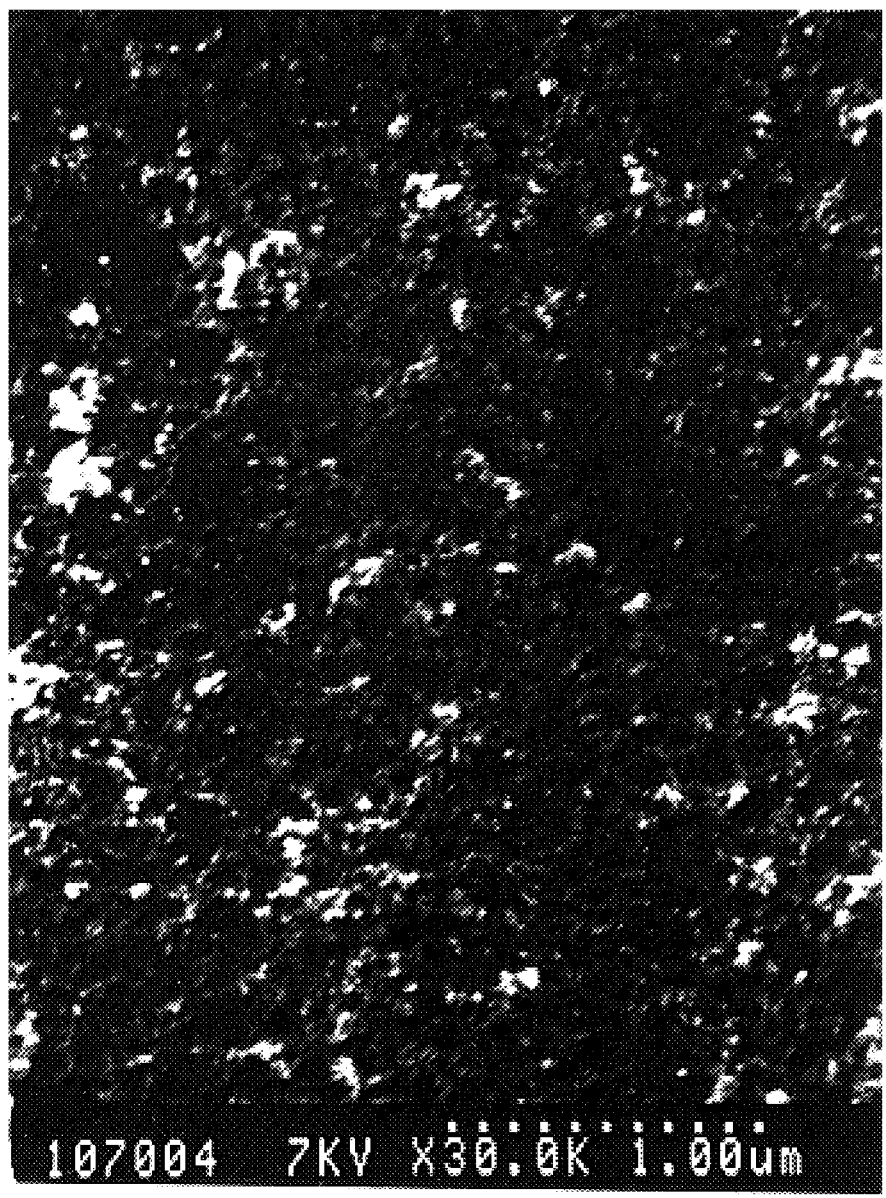
FIG. 4 is a scanning electron micrograph (×600) showing the cross section of the porous flat-sheet membrane prepared according to Example 9 of the present invention.
Figure 5:
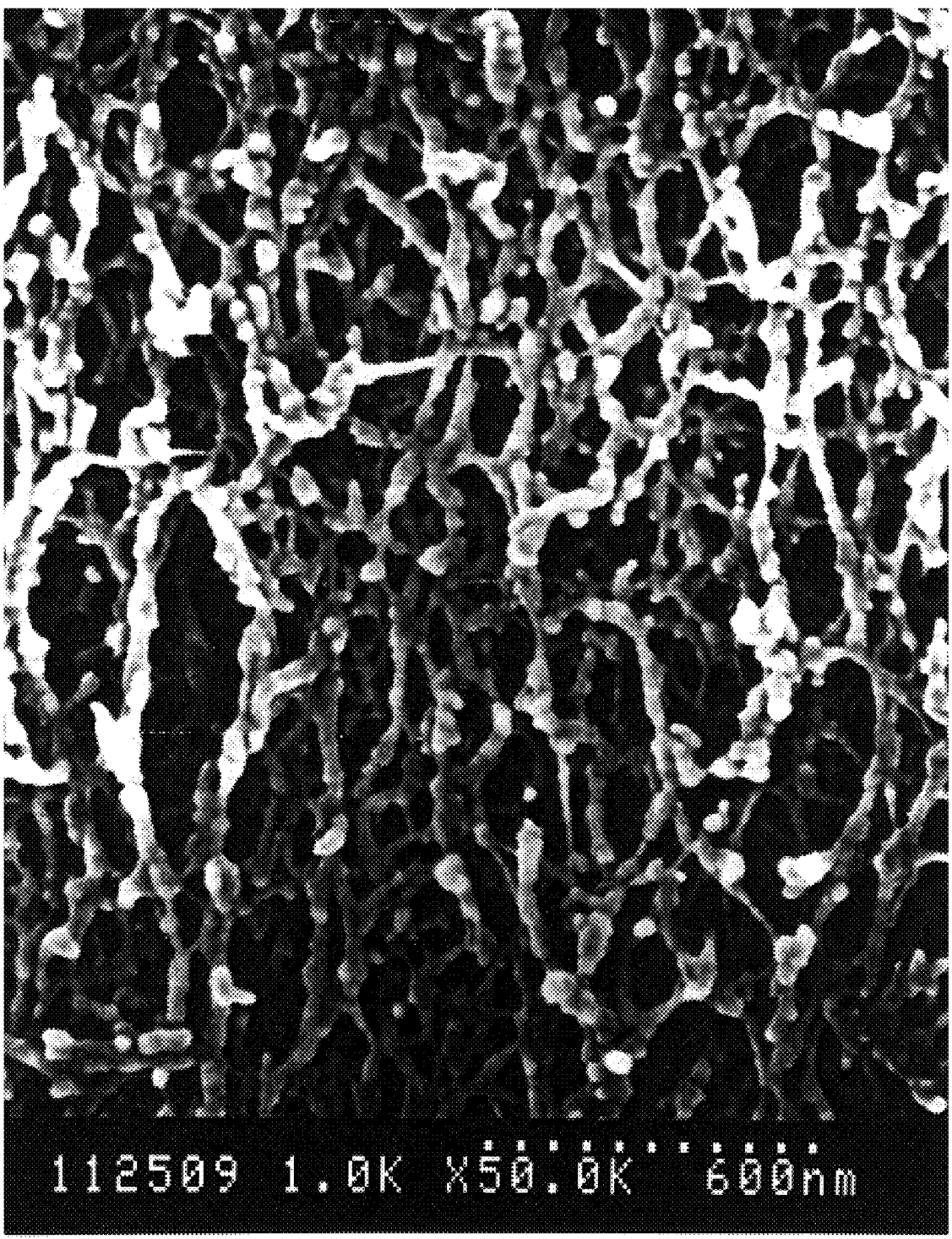
FIG. 5 is a scanning electron micrograph (×50,000) showing the outer surface of the hollow fiber membrane obtained in Example 11 of the present invention.
Figure 6:
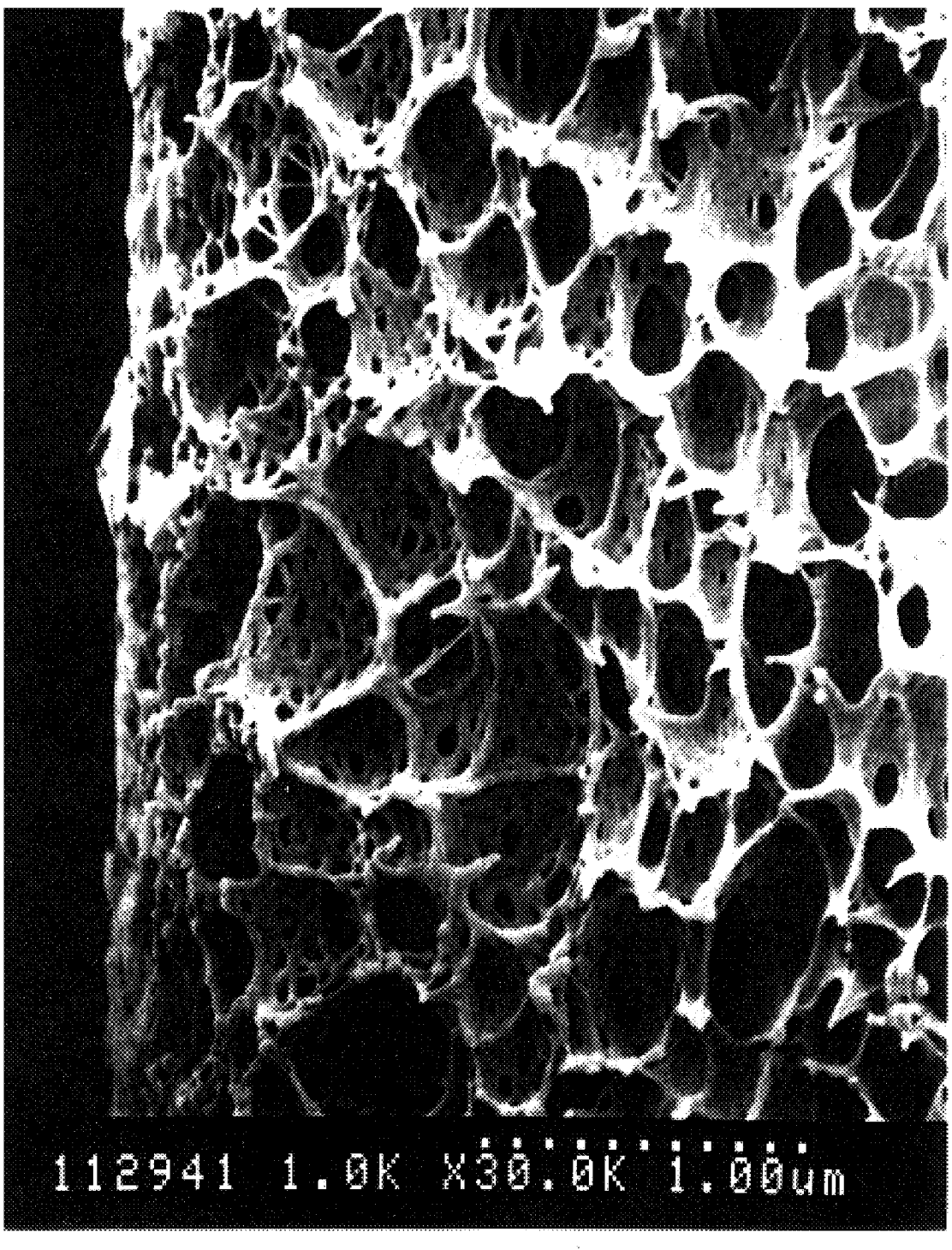
FIG. 6 is a scanning electron micrograph (×30,000) showing the cross section in the vicinity of the outer surface of the hollow fiber membrane prepared according to Example 11 of the present invention.
Figure 7:
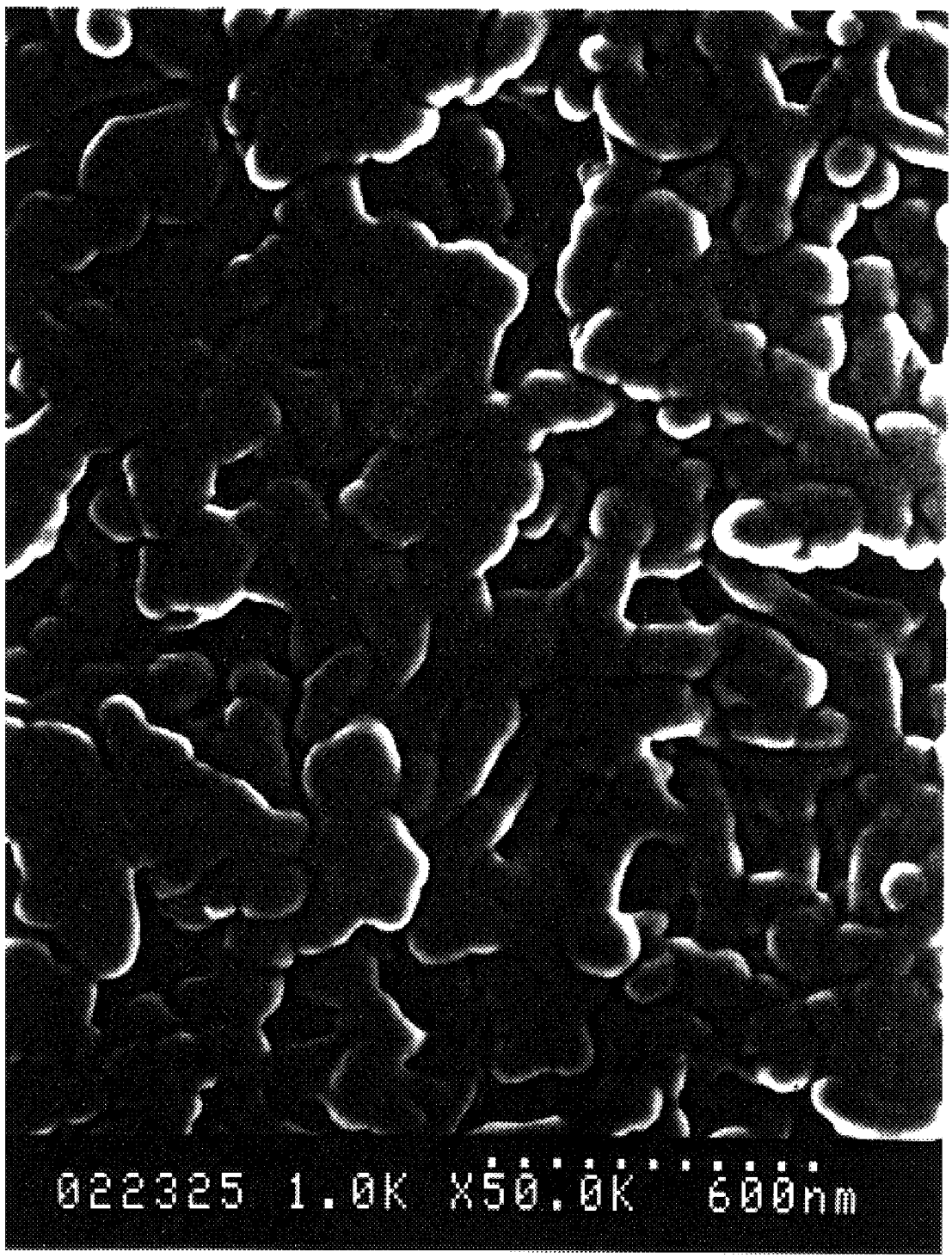
FIG. 7 is a scanning electron micrograph (×50,000) showing the outer surface of the hollow fiber membrane obtained in Example 12 of the present invention.
Figure 8:
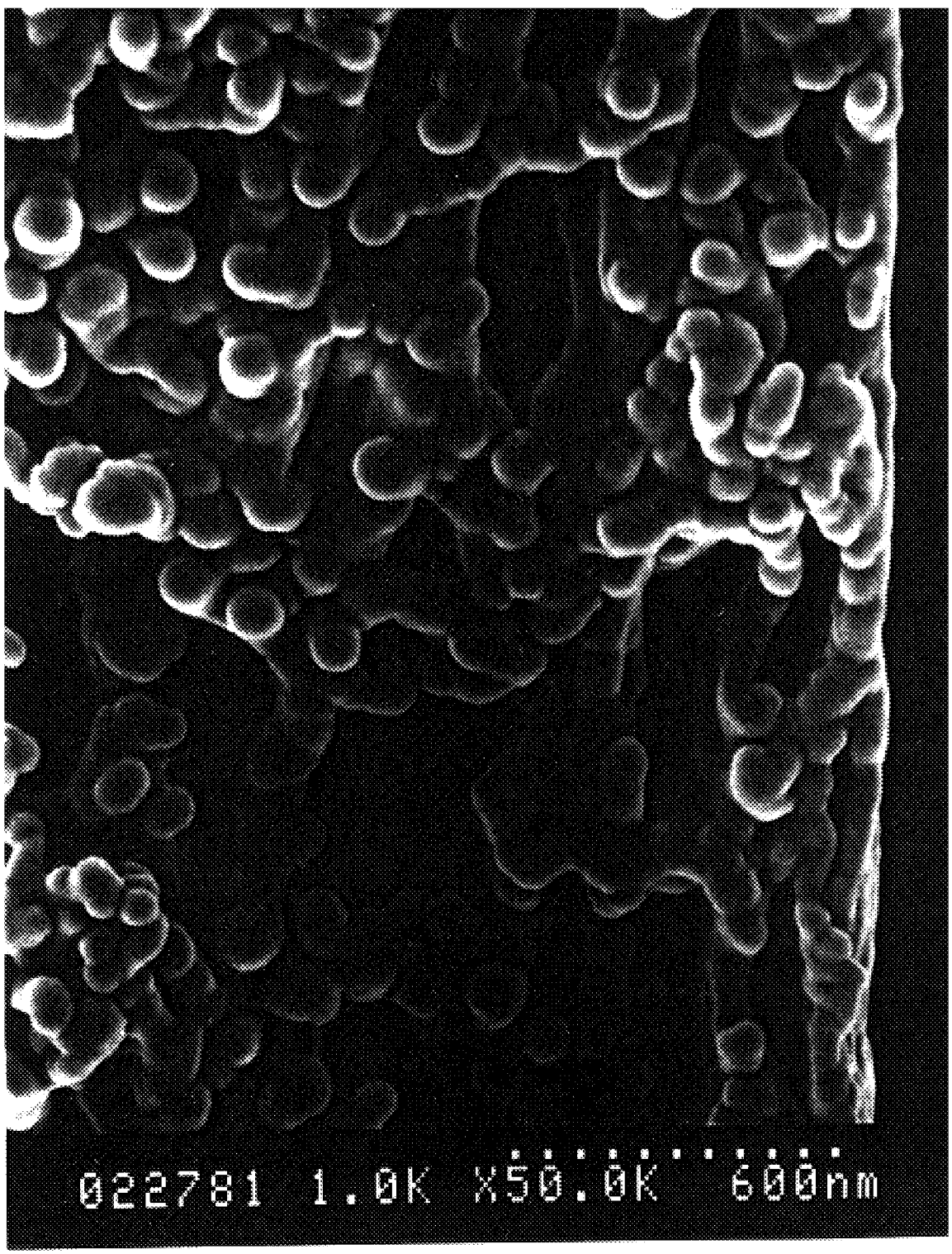
FIG. 8 is a scanning electron micrograph (×50,000) which shows the cross section in the vicinity of the outer surface of the hollow fiber membrane prepared according to Example 12 of the present invention.
Figure 9:
FIG. 9 is a scanning electron micrograph (×50,000) which shows the surface of the porous flat-sheet membrane prepared in Comparative Example 3, said surface being in contact with a coagulation liquid when said membrane was immersed in the liquid.
Figure 10:
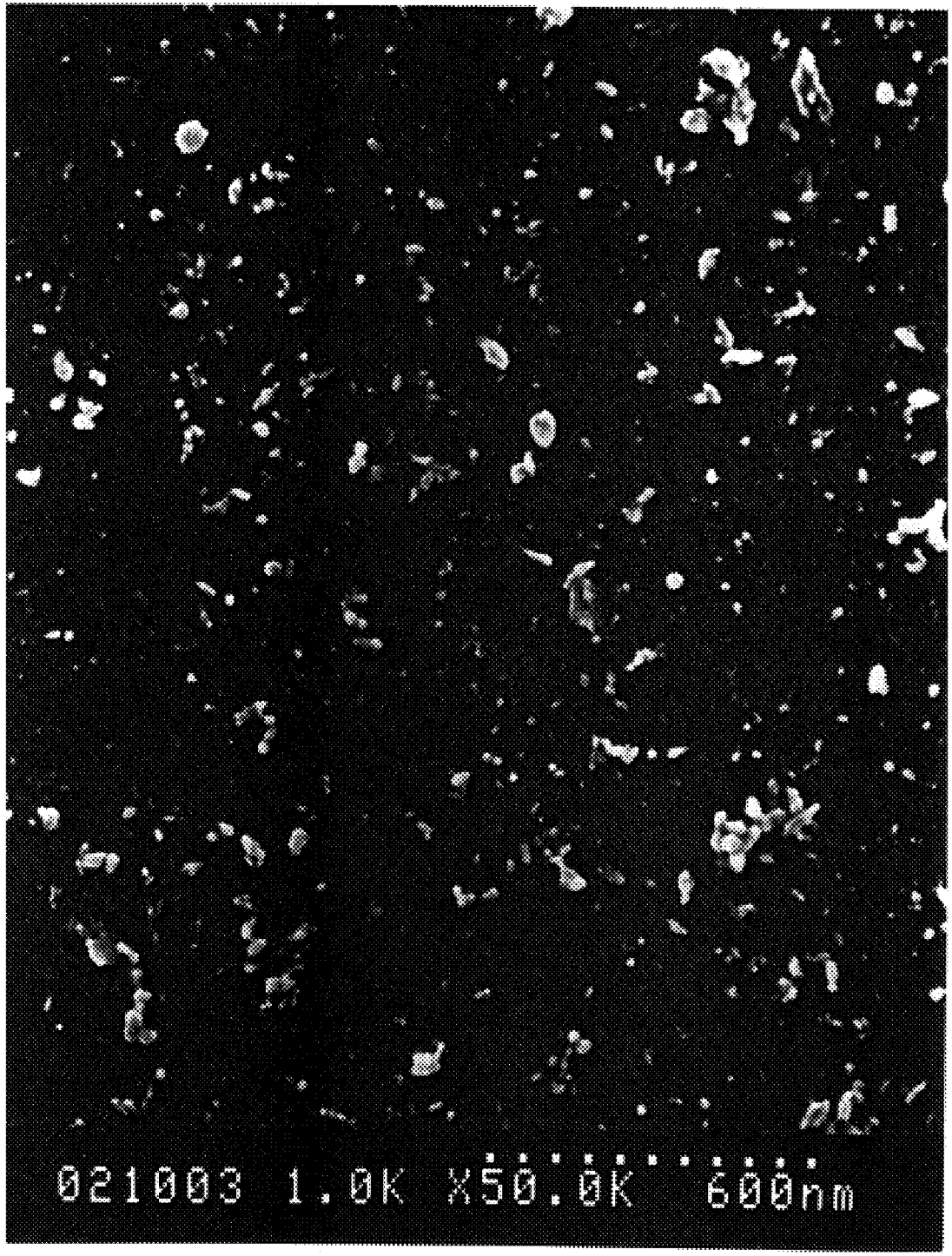
FIG. 10 is a scanning electron micrograph (×50,000) which shows the surface of the porous flat-sheet membrane prepared in Comparative Example 4, said surface being in contact with a coagulation liquid when said membrane was immersed in the liquid.

Hereinbelow, the present invention will be described in more detail with reference to the following examples.

First, descriptions will be given on the measuring and evaluating methods adopted in the following examples and comparative examples.

(1) Water permeability

If the form of the membrane is that of a flat-sheet membrane, the flat-sheet membrane is placed in a plastic filter holder (Trade name: PP-25, a product of Advantec Toyo, Co., Ltd.) and 25 degree C. distilled water is passed through the membrane at a pressure of 1 kg/cm$^2$ from its surface contacted with a coagulation liquid at the time of membrane formation to measure the volume of the distilled water passed therethrough for 20 minutes. Water permeability is expressed as water flux by calculating the said volume in terms of l/m$^2$·hr·kg/cm$^2$. Further, if the form of the membrane is that of a hollow fiber, 25 degree C. distilled water is injected at a pressure of 1 kg/cm$^2$ into the bore of a 30-cm long hollow fiber whose one end is sealed to measure the volume of the distilled water permeated through the wall of the hollow fiber for 20 minutes. Water permeability is expressed as water flux by calculating said volume in terms of l/m$^2$·hr·kg/cm$^2$.

(2) Fractionating characteristics

For the purpose of evaluating membrane fractionating characteristics, a method of measuring the rejection ratio of a SB latex having a particle size of 0.1 μm will be described hereinafter.

SB latexes are added to distilled water to prepare feed SB latex solutions so that they may respectively have a concentration of 0.2 percent by weight. If the form of the membrane is that of a flat-sheet membrane, each feed solution is supplied as in the method of measuring the water permeability to obtain a filtrate which is passed through the membrane for 10 minutes. On the other hand, if the form of the membrane is that of a hollow fiber membrane, each of the 25 degree C. feed solutions is injected through the bore of the hollow fiber at a linear rate of 1 m/sec. and an average filtration pressure of 1 kg/cm² for 10 minutes to obtain a filtrate through the wall of the hollow fiber membrane. The rejection ratio of each membrane is calculated according to the following formula:

rejection ratio (%)=(1−C/C₀)×100 wherein C and C₀ indicate the respective concentrations of the obtained filtrate and the feed S B latex solution.

(3) Crystallinity

Wide-angle X-ray diffractometry will be described to measure crystallinity hereinafter.

By use of X-ray diffraction equipment (MXP-18, a product of MAC Science Co., Ltd.), the X-ray obtained from a Cu target with an acceleration voltage of 50 kv and acceleration current of 200 mA is made monochromic with an Ni monochrometer. A specimen is placed on a fiber sample table if the form of the specimen is that of a flat-sheet membrane or hollow fiber membrane and is subjected to measurement by means of penetration. The scattered X-ray from the specimen is scanned in the range of 12° to 32° and 50 points are adopted per 1° and the measurement is performed for 1.2 seconds per point. The crystallinity of the specimen is obtained from the diffraction image result from the above procedure according to the method reported by Blundell and Osborn (Polymer, 24, P.953, 1983).

(4) Porosity

A dried porous membrane is immersed in 25 degree C. ethylene glycol for 30 hours and ethylene glycol residual on the surface thereof is thoroughly wiped up from said surface. The porosity is calculated from the difference between the weights of the membrane before and after the immersion thereof according to the following formula.

porosity (%)={(post-immersion membrane weight −pre-immersion membrane weight)/(apparent membrane volume×ethylene glycol density)}×100

Example 1 will now be described hereinafter as an embodiment in which a membrane forming stock solution which comprised an aromatic polyether ketone and a strong acid was in the neighborhood of microphase separation and a solvent which was lower than water in coagulation capability was used as a coagulation liquid.

Example 1

To a one-liter round-bottomed flask, 920 grams of 87.6% sulfuric acid and 80 grams of the aromatic polyether ketone, thoroughly dried, comprising the repeating units in Formula (1) and having a particle size of ca. 3 mm or smaller, a reduced viscosity of 0.96 dl/g, a glass transition point of 151 degrees C. and a melting point of 373 degrees C. were added and stirred under vacuum for 10 hours while being deaerated to obtain a yellowish brown, transparent and homogenous solution as a membrane forming stock solution. When 0.06 grams of distilled water was added to the stock solution per 10.0 grams of said solution under agitation, the transparent stock solution became turbid and proceeded toward microphase separation. Thus, the prepared membrane forming stock solution was in the neighborhood of a microphase separation as defined herein.

The membrane forming stock solution was applied to a glass plate with an applicator to provide a thickness of 100 μm on said glass plate and immediately immersed in 73% sulfuric acid of 26 degrees C. for coagulation to obtain a porous membrane. The membrane gradually separated from said glass plate so that separation was complete after less than 5 minutes of immersion.

The porous membrane was taken out from the aforementioned sulfuric acid 5 minutes after it was immersed therein and was soaked in 26 degree C. water for 1 hour, in running water for 3 hours and in ethanol for 3 hours to wash away the residual sulfuric acid from said membrane. The aromatic polyether ketone of the prepared porous membrane had a crystallinity of less than 10 percent by weight.

For heat treatment, the porous membrane was immersed in 60 degree C. triethylene glycol for 2 hours and further immersed in 200 degree C. triethylene glycol for 2 hours. Subsequently, the porous membrane was repeatedly soaked in ethanol five times to wash away the residual triethylene glycol from the surfaces of the membrane and the interior thereof and was kept in virgin ethanol.

The aromatic polyether ketone of the prepared porous membrane was not substantially sulfonated and had a crystallinity of 26 percent by weight. The membrane surface contacted with the coagulation liquid when said membrane was immersed therein had open pores having an average pore diameter of 1.1 μm at an open pore ratio of 50 percent, while the membrane surface contacted with the glass plate had open pores having an average pore diameter of 1.2 μm at an open pore ratio of 50 percent. The interior structure of the membrane was that of a honeycomb wherein the pore diameters are not uniform in the direction of its thickness.

Further, the membrane had a porosity of 72 percent and a water flux of 1,800 l/m²·hr·kg/cm².

The prepared membrane was immersed in 150 degree C. water for 10 hours by use of an autoclave. The obtained membrane had a water flux of 1,780 l/m²·hr·kg/cm² and showed excellent heat stability.

Comparative Example 1

A porous membrane was prepared in the same way as in Example 1 except that 25 degree C. water was used as a coagulation liquid.

The aromatic polyether ketone of the prepared porous membrane was not substantially sulfonated and had a crystallinity of 25 percent by weight. No open pores having a pore diameter of 0.02 μm or larger were observed on the membrane surface which was contacted with the coagulation liquid when the membrane was immersed therein. The membrane had interior pores of which the diameters were not uniform in the direction of the membrane thickness and had finger-like voids therein, having a tight skin layer in the vicinity of the surface contacted with the coagulation liquid. The porosity of the membrane was 68 percent and the water flux thereof was less than 10 l/m²·hr·kg/cm²; which showed low water permeability.

Comparative Example 2

Example 1 was repeated except that the membrane was immersed for 2 hours in triethylene glycol of 110 degrees C., which is lower than the glass transition point of the aromatic polyether ketone used herein, instead of immersing it in 200 degree C. triethylene glycol after soaking it in 60 degree C. triethylene glycol for 2 hours.

The aromatic polyether ketone of the prepared porous membrane was not substantially sulfonated and had a crystallinity of less than 10 percent by weight. The membrane surface contacted with the coagulation liquid when said membrane was immersed therein had open pores having an average pore diameter of 1.0 μm at an open pore ratio of 50 percent, while the membrane surface contacted with the glass plate had open pores having an average pore diameter of 1.2 μm at an open pore ratio of 55 percent. The internal structure of the membrane was that of a honeycomb wherein the pore diameters are not uniform in the direction of its thickness.

Further, the membrane had a porosity of 73 percent and a water flux of 2,800 $l/m^2 \cdot hr \cdot kg/cm^2$.

The obtained membrane was immersed in 140 degree C. water for 10 hours by use of an autoclave. The membrane was remarkably degraded in water permeability, had a water flux of 170 $l/m^2 \cdot hr \cdot kg/cm^2$ and was low in heat stability.

Comparative Example 3

Example 1 was repeated to prepare a porous membrane except for using 98.7% sulfuric acid in the preparation of a membrane forming stock solution and water of 26 degrees C. as a coagulation liquid.

To the membrane forming stock solution, 0.8 gram of distilled water was slowly added per 10.0 grams of said solution under sufficient agitation and it was found that the stock solution was transparent and in a condition outside the neighborhood of microphase separation.

The aromatic polyether ketone of the obtained porous membrane had a crystallinity of 26 percent by weight, and no open pores having a diameter of 0.02 $\mu$m or larger were observed on the membrane surface contacted with the coagulation liquid when said membrane was immersed therein.

Comparative Example 4

Example 1 was repeated except that the membrane forming stock solution of Comparative Example 3 was used, 25 degree C. glacial acetic acid was employed as a coagulation liquid and the immersion of said stock solution was performed in said coagulation liquid for 1 hour.

The aromatic polyether ketone of the obtained membrane had a crystallinity of 24 percent by weight and no open pores having a diameter of 0.02 $\mu$m or larger were observed on the membrane surface which had been contacted with the coagulation liquid. In the instant comparative example, the coagulation liquid turned somewhat turbid whitish when the stock solution was coagulated therein, and substances which cause white turbidity were much adhered to the membrane surface. The membrane had a water flux of not less than 10 $l/m^2 \cdot hr \cdot kg/cm^2$.

Example 2

Example 1 was repeated to prepare a porous membrane except that 80% sulfuric acid of 23 degree C. was used as a coagulation liquid.

The aromatic polyether ketone of the obtained membrane had a crystallinity of 28 percent by weight. The membrane surface contacted with the coagulation liquid when said membrane was immersed therein had open pores having an average pore diameter of 1.5 $\mu$m at an open pore ratio of 48 percent, while the other membrane surface contacted with a glass plate had open pores having an average pore diameter of 1.7 $\mu$m at an open pore ratio of 55 percent. The cross-sectional structure of the membrane was an anisotropic structure in which the pores became large in diameter from the membrane surface contacted with the coagulaton liquid towards the other membrane surface contacted with the glass plate. The interior pores of the membrane had walls having a microporous honeycomb structure.

Further, the membrane had a porosity of 70 percent and a water flux of 2,900 $l/m^2 \cdot hr \cdot kg/cm^2$. There were no problems in the heat stability of the membrane at 150 degrees C. and 180 degrees C.

Example 3

Example 1 was repeated to prepare a porous membrane except for using 75% sulfuric acid of 23 degree C. as a coagulation liquid and a membrane forming stock solution which contained 5 percent by weight of polyvinyl pyrrolidone having a weight-average molecular weight of 900,000.

The aromatic polyether ketone of the obtained membrane was not substantially sulfonated and had a crystallinity of 27 percent by weight. The membrane surface contacted with the coagulation liquid when said membrane was immersed therein had open pores having an average pore diameter of 0.8 $\mu$m at an open pore ratio of 40 percent, while the other membrane surface contacted with a glass plate had open pores having an average pore diameter of 1.5 $\mu$m at an open pore ratio of 50 percent. The cross-sectional structure of the membrane was an anisotropic structure in which the pores increased in diameter from the membrane surface contacted with the coagulation liquid towards the other membrane surface contacted with the glass plate. The membrane had interior voids having an average diameter of 20 $\mu$m in terms of spheres and walls around the voids had a microporous honeycomb structure.

Further, the membrane had a porosity of 72 percent and a water flux of 1,900 $l/m^2 \cdot hr \cdot kg/cm^2$. There were no problems in the heat stability of the membrane in water of 150 degrees C.

Example 4

Example 1 was repeated to prepare a porous membrane except for using 75% sulfuric acid of 24 degree C. as a coagulation liquid and a membrane forming stock solution containing 10 percent by weight of polyethylene glycol having a weight-average molecular weight of 1,000.

The aromatic polyether ketone of the obtained membrane was not substantially sulfonated and had a crystallinity of 27 percent by weight. The membrane surface contacted with the coagulation liquid when said membrane was immersed therein had open pores having an average pore diameter of 0.07 $\mu$m at an open pore ratio of 28 percent, while the other membrane surface contacted with a glass plate had open pores having an average pore diameter of 1.2 $\mu$m at an open pore ratio of 43 percent. The cross-sectional structure of the membrane was an anisotropic structure in which the pores increased in diameter from the membrane surface contacted with the coagulation liquid towards the other membrane surface contacted with the glass plate. The interior pores of the membrane had walls having a finely porous honeycomb structure.

Further, the membrane had a porosity of 65 percent and a water flux of 2,100 $l/m^2 \cdot hr \cdot kg/cm^2$.

Hereinbelow, Examples 5 through 7 will be described as embodiments wherein membrane forming stock solutions respectively contained thickening agents, and liquids that were low in the capability of dissolving said thickening agents were respectively used as coagulation liquids.

Example 5

To a one-liter round-bottomed separable flask, 920 grams of 98.5% sulfuric acid and 80 grams of the aromatic polyether ketone comprising the repeating units of Formula (5) and having a reduced viscosity of 1.1 dl/g were added and further thereto 92.8 grams of sufficiently dried polyvinyl pyrrolidone having a weight-average molecular weight of 10,000 was added to obtain a mixture. The mixture was stirred for dissolution under vacuum for 12 hours while being deaerated to prepare a yellowish brown, transparent and homogenous solution as a membrane forming stock solution. When 0.10 grams of distilled water was added to the stock solution per 10.0 grams of said solution under agitation at 25 degrees C., the transparent stock solution turned turbid and proceeded towards microphase separation. The prepared membrane forming stock solution was thus in the neighborhood of the microphase separation as defined herein.

The membrane forming stock solution was applied to a glass plate with an applicator to provide a thickness of 100 μm on said glass plate and was immediately immersed and coagulated in diethyleneglycol dimethylether of 26 degrees C. for 30 seconds to obtain a porous membrane, which was immersed in 26 degree C. water for 5 minutes and soaked in running water for 2 hours and then in ethanol for 3 hours.

Subsequently, the porous membrane was immersed in a 5,000 ppm aqueous sodium hypochlorite solution at 25 degrees C. for 20 hours and then in 50 degree C. water for 10 hours and was kept in 25 degree C. ethanol.

As the heat treatment, the obtained porous membrane was immersed in 70 degree C. diethylene glycol for 2 hours and further immersed in 220 degree C. diethylene glycol for 2 hours. Subsequently, the immersion of the porous membrane was repeated in 25 degree C. ethanol 5 times to wash away the residual diethylene glycol from the surfaces of the membrane and the interior thereof and was kept in ethanol.

The aromatic polyether ketone of the obtained membrane was not substantially sulfonated and had a crystallinity of 32 percent by weight. The membrane surface contacted with the coagulation liquid when said membrane was immersed therein had circular open pores having an average pore diameter of 0.035 μm at an open pore ratio of 15 percent, while the other membrane surface contacted with a glass plate had circular open pores having an average pore diameter of 0.750 μm at an open pore ratio of 13 percent. The interior structure of the membrane, which had voids therein, had an anisotropic structure in which the pore diameters became larger as they went inward.

Further, the membrane had a porosity of 78 percent, water flux of 4,500 $l/m^2 \cdot hr \cdot kg/cm^2$ and a rejection ratio of 95 percent or more against the SB latex which had a particle size of 0.1 μm. The membrane had no problems in heat stability against water of 150 degrees C.

Comparative Example 5

Example 5 was repeated to prepare a porous membrane except that distilled water was used as a coagulation liquid.

The aromatic polyether ketone of the obtained membrane had a crystallinity of 31 percent by weight. No open pores having a diameter of 0.02 μm or larger were observed on the membrane surface contacted with the coagulation liquid when the membrane was immersed therein.

Further, the membrane had a water flux of 130 $l/m^2 \cdot hr \cdot kg/cm^2$ and had a rejection ratio of 95 percent or more against the SB latex having a particle size of 0.1 μm for 1 minute after the commencement of me asurement, but further filtration could not be continued because of membrane plugging after 1 minute from the beginning of measurement.

Example 6

Example 5 was repeated to prepare a porous membrane except for using 26 degree C. triethyleneglycol dimethylether as a coagulation liquid.

At 25 degrees C., 1 gram of polyvinyl pyrrolidone, which was the same as that used in the preparation of the membrane forming stock solution, was added to 100 grams of triethyleneglycol dimethylether but was hardly dissolved.

The aromatic polyether ketone of the obtained membrane was not substantially sulfonated and had a crystallinity of 33 percent by weight. The membrane surface contacted with the coagulation liquid when said membrane was immersed therein had open pores having an average pore diameter of 0.06 μm at an open pore ratio of 16 percent, while the other membrane surface contacted with a glass plate had open pores having an average pore diameter of 0.8 μm at an open pore ratio of 14 percent.

The membrane had a water flux of 4,800 $l/m^2 \cdot hr \cdot kg/cm^2$ and a ratio of 95 percent or more in the rejection of the SB latex which had a particle size of 0.1 μm. The membrane had no problems in heat stability against water of 150 degrees C.

Example 7

Example 5 was repeated to prepare a porous membrane except that 22 degree C. acetone was used as a coagulation liquid. At 25 degrees C., 1 gram of polyvinyl pyrrolidone, which was the same as that used in the preparation of the membrane forming stock solution, was added to 100 grams of acetone but was not homogeneously dissolved.

The aromatic polyether ketone of the obtained membrane was not substantially sulfonated and had a crystallinity of 33 percent by weight. The membrane surface contacted with the coagulation liquid when said membrane was immersed therein had open pores having an average pore diameter of 0.04 μm at an open pore ratio of 15 percent, while the other membrane surface contacted with a glass plate had circular open pores having an average pore diameter of 1.3 μm at an open pore ratio of 15 percent.

The membrane had a water flux of 3,200 $l/m^2 \cdot hr \cdot kg/cm^2$ and a resection ratio of 95 percent or more against the SB latex having a particle size of 0.1 μm. The membrane had no problems in heat stability against water of 150 degrees C.

Hereinbelow, Examples 8 through 10 will describe embodiments wherein membrane forming stock solutions containing thickening agents and liquids which were low in coagulation capability were respectively used as coagulation liquids.

Example 8

Example 5 was repeated to prepare a porous membrane except that 75% sulfuric acid of 23 degrees C. was used as a coagulation liquid.

The aromatic polyether ketone of the obtained membrane was not substantially sulfonated and had a crystallinity of 32 percent by weight. The membrane surface contacted with the coagulation liquid when said membrane was immersed therein had open pores having an average pore diameter of 0.4 μm at an open pore ratio of 15 percent, while the other membrane surface contacted with a glass plate had circular open pores having an average pore diameter of 1.5 μm at an open pore ratio of 20 percent. The cross-sectional structure of the membrane was an anisotropic structure in which the pores became large in diameter from the membrane surface contacted with the coagulation liquid towards the other membrane surface contacted with the glass plate.

The membrane had a water flux of 3,200 $l/m^2 \cdot hr \cdot kg/cm^2$ and a SB latex rejection ratio of 95 percent or more, the SB latex having a particle size of 0.1 μm. The membrane had no problems in heat stability against water of 150 degrees C.

Example 9

Example 5 was repeated to prepare a porous membrane except that a 90% aqueous isopropyl alcohol solution of 23 degrees C. was used as a coagulation liquid and that heat treatment was performed for 1 hour by using 260 degree C. tetraethylene glycol instead of 220 degree C. triethylene glycol.

The aromatic polyether ketone of the obtained membrane was not substantially sulfonated and had a crystallinity of 37 percent by weight. The membrane surface contacted with the coagulation liquid when said membrane was immersed therein had open pores having an average pore diameter of 0.09 μm at an open pore ratio of 20 percent, while the other membrane surface contacted with a glass plate had open pores having an average pore diameter of 2.0 μm at an open pore ratio of 20 percent. Further, the cross-sectional structure of the membrane was an anisotropic structure in which the pores became large in diameter from the membrane surface contacted with the coagulation liquid towards the other membrane surface contacted with the glass plate.

The membrane had a water flux of 7,500 l/m$^2$·hr·kg/cm$^2$ and had a ratio of 95 percent or more in the rejection of SB latex having a particle size of 0.1 μm. The membrane had no problem in heat stability against water of 150 degrees C.

Example 10

Example 9 was repeated to prepare a porous membrane except for the use of a 95% aqueous solution of isopropyl alcohol as a coagulation liquid.

The aromatic polyether ketone of the obtained membrane was not substantially sulfonated and had a crystallinity of 36 percent by weight. The membrane surface contacted with the coagulation liquid when said membrane was immersed therein had open pores having an average pore diameter of 0.11 μm at an open pore ratio of 18 percent, while the other membrane surface contacted with a glass plate had circular open pores having an average pore diameter of 2.6 μm at an open pore ratio of 20 percent. Further, the cross-sectional structure of the membrane was an anisotropic structure in which the pores became larger in diameter from the membrane surface contacted with the coagulation liquid towards the other membrane surface contacted with the glass plate.

The membrane had a water flux of 14,000 l/m$^2$·hr·kg/cm$^2$ and a SB latex rejection ratio of 95 percent or more, the SB latex having a particle size of 0.1 μm. The membrane had no problems in heat stability against water of 150 degrees C.

The following are examples wherein the forms of the membranes are those of hollow fiber membranes.

Example 11

The instant example illustrates a process for preparing a hollow fiber membrane wherein a membrane forming stock solution was extruded, contacted with the vapor of a coagulation liquid and immersed in said coagulation liquid. The stock solution which was prepared according to Example 5 was employed in the instant example.

The stock solution of 25 degrees C. was extruded through an annular orifice of a coaxial double-tube die for hollow fiber spinning, while passing 24 degree C. diethyleneglycol dimethylether having a concentration of 95 percent through the bore of said die as a bore injection coagulant at the same time. The extruded stock solution was immersed and coagulated in a 65 degree C. water containing coagulation bath underlaid 15 cm below the die and was wound at a rate of 8.6 m/min. A polypropylene cylindrical case 9 cm in diameter was provided between the die and the coagulation bath so that the outer surface of the stock solution which was extruded from said die in the form of a hollow fiber might be uniformly contacted with the water vapor which was emitted from said coagulation bath.

The obtained hollow fiber membrane was cut in ca. 40 cm in length and was immersed for washing in 50 degree C. distilled water for 12 hours, in 24 degree C. ethanol for 10 hours, in a 8,000 ppm aqueous solution of sodium hypochlorite for 15 hours, in 60 degree C. water for 10 hours a.nd in ethanol for 15 hours.

The hollow fiber membrane was taken out from ethanol and was immersed in 65 degree C. triethylene glycol for 2 hours and subsequently in 25 degree C. triethylene glycol while keeping it in a wet condition. In an open system, the hollow fiber membrane was heated up to 200 degrees C. for about 1 hour, was kept at 200 degrees C. for 2 hours for the purpose of heat treatment, and was cooled down to 28 degrees C. for about 1 hour.

Subsequently, the hollow fiber membrane was soaked in 60 degree C. distilled water for 5 hours and was further soaked and washed in 50 degree C. ethanol for 5 hours in total, while replacing the ethanol with fresh ethanol every hour and was kept in distilled water at room temperature so that the membrane would not become dry.

The obtained porous hollow fiber membrane had an inner diameter of ca. 0.64 mm and an outer diameter of 1.02 mm. The aromatic polyether ketone of the porous hollow fiber membrane was not substantially sulfonated and had a crystallinity of 27 percent by weight. The inner surface of the porous hollow fiber membrane had circular open pores having an average pore diameter of ca. 0.03 μm at an open pore ratio of 13 percent, while the outer surface thereof was in a three-dimensional network structure which had open pores having an average pore diameter of ca. 0.4 μm at an open pore ratio of 68 percent. The cross-section of the hollow fiber membrane showed that the structure in the vicinity of the outer surface thereof was that of a honeycomb having microporous walls.

The hollow fiber membrane had a porosity of 72 percent, a water flux of 950 l/m$^2$·hr·kg/cm$^2$ and a SB latex rejection ratio of 95 percent or more, the SB latex having a particle size of 0.1 μm.

Example 12

Example 11 was repeated to prepare a hollow fiber membrane except that polyethylene glycol having a weight-average molecular weight of 400 was employed instead of polyvinyl pyrrolidone in order to prepare a membrane forming stock solution and that a 70% aqueous polyethylene glycol solution was used as a bore injection coagulant. The hollow fiber membrane was wound up and then immersed and washed in 50 degree C. water for 10 hours and in 26 degree C. ethanol for 15 hours.

The hollow fiber membrane was taken out from the ethanol and was immersed in 65 degree C. triethylene glycol for 2 hours while keeping said membrane in a wet condition. The membrane was further immersed in 25 degree C. triethylene glycol and was heated up to 200 degrees C. for Ca. 1 hour and was kept at 200 degrees C. for 2 hours for heat treatment in an open system. Subsequently, the membrane was cooled down to 28 degrees C. for ca. 1 hour.

Thereafter, the hollow fiber membrane was immersed in 60 degree C. water for 5 hours and then soaked in 50 degree C. ethanol for 5 hours in total while replacing the ethanol with fresh ethanol every hour for washing purposes and was kept in distilled water at room temperature in order that the membrane would not dry out.

The obtained porous hollow fiber membrane had an inner diameter of ca. 0.62 mm and an outer diameter of ca. 1.01 mm. The aromatic polyether ketone of the porous hollow fiber membrane was not substantially sulfonated and had a crystallinity of 27 percent by weight. The inner surface of the porous hollow fiber membrane had open pores having an average pore diameter of ca. 0.02 µm at an open pore ratio of 13 percent, while the outer surface thereof had a three-dimensional network structure which had open pores having an average pore diameter of ca. 0.3 µm at an open pore ratio of 15 percent. The cross-section of the hollow fiber membrane showed that the structure in the vicinity of the outer surface thereof was a three-dimensional network structure which was composed of the fibrils of connected particles.

The hollow fiber membrane had a porosity of 71 percent and a water flux of 1,150 l/m²·hr·kg/cm² and a rejection ratio of 95 percent or more against SB latex having a particle size of 0.1 µm.

Comparative Example 6

A hollow fiber membrane was prepared in the same way as in Example 11 except that the temperature of the coagulation bath was 15 degrees C. and that the distance between the spinneret and the coagulation bath was 5 cm.

The obtained porous hollow fiber membrane had an inner diameter of ca. 0.64 mm and an outer diameter of ca. 1.08 mm. The aromatic polyether ketone of the porous hollow fiber membrane was not substantially sulfonated and had a crystallinity of 27 percent by weight. The inner surface of the porous hollow fiber membrane had open pores having an average pore diameter of ca. 0.02 µm, while the outer surface thereof did not have open pores having an average pore diameter of Ca. 0.010 µm or larger and was covered with a tight skin layer.

The hollow fiber membrane had a porosity of 69 percent and a water flux of 98 l/m²·hr·kg/cm².

Industrial Applicability

In accordance with the present invention, a porous crystalline aromatic polyether ketone membrane may be provided which is excellent in heat resistance, chemical resistance, water resistance, water permeability and a balance of water permeability and fractionating characteristics.

What is claimed is:

1. An anisotropically porous membrane which is obtained according to a wet process, which comprises a substantially non-sulfonated aromatic polyether ketone having a crystallinity of 10 percent by weight or higher and which has open pores having an average pore diameter of 0.02 to 30.00 µm on both surfaces of said membrane at an open pore ratio of 7 to 90 percent.

2. The membrane according to claim 1, wherein the open pores of one surface of said membrane differ from those of the other surface thereof in average pore diameter.

3. The membrane according to claim 1, wherein one of the surfaces of said membrane has open pores having an average pore diameter of 0.02 to 10.00 µm.

4. The membrane according to claim 1, wherein the open pore ratio ranges from 15 to 70 percent.

5. The membrane according to claim 1, wherein the crystallinity is 25 percent by weight or higher.

6. The membrane according to claim 1, wherein the form of the open pores is circular.

7. The membrane according to claim 1 wherein said membrane contains a three-dimensional structure.

8. The membrane according to claim 1, wherein said membrane contains voids having a diameter of 10 µm or larger in terms of spherical diameter.

9. The membrane according to claim 1, wherein said membrane has a water flux of 100 to 20,000 l/m²·hr·kg/cm² at 25 degrees C.

10. The membrane according to claim 1, wherein the form of said membrane is that of a hollow fiber membrane.

11. The membrane according to claim 1, wherein the aromatic polyether ketone comprises repeating units represented by formulae (1), (2), (3), (4) and (5), respectively:

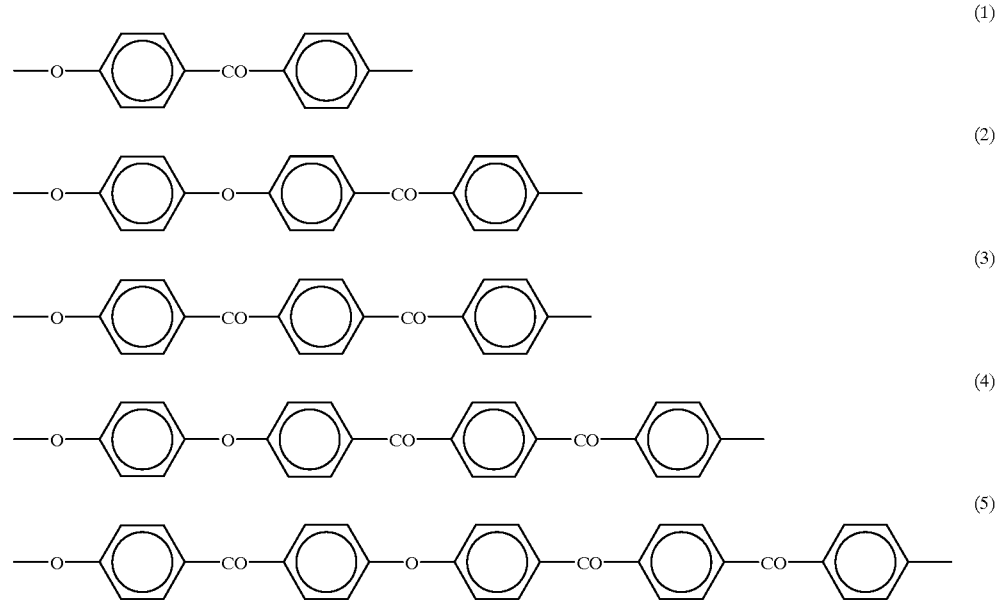

12. The membrane as claimed in claim 1, which has the capability of separating crud from the condensate generated by a power plant.

* * * * *